(12) United States Patent
Fouquay et al.

(10) Patent No.: US 12,421,345 B2
(45) Date of Patent: Sep. 23, 2025

(54) POLYIMINES AND USES THEREOF

(71) Applicant: BOSTIK SA, Colombes (FR)

(72) Inventors: Stéphane Fouquay, Venette (FR); Federico Sanz, Venette (FR)

(73) Assignee: BOSTIK SA, Colombes (FR)

( * ) Notice: Subject to any disclaimer, the term of this patent is extended or adjusted under 35 U.S.C. 154(b) by 570 days.

(21) Appl. No.: 17/783,307

(22) PCT Filed: Dec. 15, 2020

(86) PCT No.: PCT/EP2020/086217
§ 371 (c)(1),
(2) Date: Jun. 8, 2022

(87) PCT Pub. No.: WO2021/122595
PCT Pub. Date: Jun. 24, 2021

(65) Prior Publication Data
US 2023/0044535 A1 Feb. 9, 2023

(30) Foreign Application Priority Data

Dec. 19, 2019 (EP) .................................. 19306695

(51) Int. Cl.
| C08G 18/30 | (2006.01) |
| C08G 18/12 | (2006.01) |
| C08G 18/48 | (2006.01) |
| C08G 18/60 | (2006.01) |

(52) U.S. Cl.
CPC .......... *C08G 18/307* (2013.01); *C08G 18/12* (2013.01); *C08G 18/4808* (2013.01); *C08G 18/606* (2013.01); *C08G 2190/00* (2013.01)

(58) Field of Classification Search
CPC ............................. C08G 18/307; C08G 18/606
See application file for complete search history.

(56) References Cited

U.S. PATENT DOCUMENTS

| 3,392,148 | A | * | 7/1968 | Zech | ...................... C08G 18/84 |
| | | | | | 525/509 |
| 3,547,848 | A | | 12/1970 | Marsh et al. | |
| 3,575,930 | A | * | 4/1971 | Dinbergs | .............. C07C 265/00 |
| | | | | | 568/602 |
| 6,765,056 | B2 | * | 7/2004 | Hobel | .................... C08G 18/83 |
| | | | | | 524/591 |
| 2006/0149025 | A1 | | 7/2006 | Burckhardt et al. | |
| 2007/0129522 | A1 | | 6/2007 | Burckhardt et al. | |
| 2010/0190014 | A1 | | 7/2010 | Burckhardt et al. | |

FOREIGN PATENT DOCUMENTS

FR  1591172 A  4/1970

OTHER PUBLICATIONS

ISA/EP; International Search Report and Written Opinion for International Patent Application No. PCT/EP2020/086217 dated Feb. 22, 2021, 12 pages.

* cited by examiner

*Primary Examiner* — Michael L Leonard
(74) *Attorney, Agent, or Firm* — NK Patent Law

(57) ABSTRACT

The present invention relates to a moisture-crosslinkable sealant composition comprising:
  at least one polyurethane P comprising at least two NCO end functions;
  at least one polyimine A obtained via a process comprising a step of reaction between at least:
    a) a (poly)urethane-aldehyde comprising at least 2 aldehyde functions;
    b) a primary diamine;
    c) optionally in the presence of a primary monoamine or a monoaldehyde if the —CHO/NH$_2$ molar ratio is other than 1.

17 Claims, No Drawings

POLYIMINES AND USES THEREOF

CROSS-REFERENCE TO RELATED APPLICATIONS

This application is a U.S. National Stage application of International Patent Application No. PCT/EP2020/086217, filed on Dec. 15, 2020, which claims the benefit of European Patent Application No. 19306695.8, filed on Dec. 19, 2019.

FIELD OF THE INVENTION

The present invention relates to a new family of polyimines, and to the compositions comprising same.

The present invention also relates to the use of these polyimines in adhesive compositions, sealants or coatings.

TECHNICAL BACKGROUND (Poly)aldimines are condensation products of primary polyamines and aldehydes, and are a well-known class of compounds. On contact with water, (poly)aldimines can hydrolyse to the corresponding amines and aldehydes. Due to their properties, aldimines can also be used as a protected form of amines.

Aldimines are especially useful in adhesive compositions based on moisture-crosslinkable polyurethanes, especially in sealants and also in adhesive compositions based on epoxides. Their use as a moisture-activatable, latent curing agent in polyurethane-based systems advantageously makes it possible to avoid the formation of bubbles, insofar as crosslinking with aldimines (blocked amines) does not lead to the release of $CO_2$ (unlike direct crosslinking of isocyanate groups in the presence of moisture).

However, aldimines (in particular aromatic aldimines) sometimes have the disadvantage of releasing volatile and odorous aldehydes, when they hydrolyze during the crosslinking of mastics.

There is therefore a need for new (poly)aldimines that make it possible to at least partially overcome at least one of the abovementioned drawbacks.

DESCRIPTION OF THE INVENTION

A. Sealant Composition

The present invention relates to a moisture-crosslinkable sealant composition comprising:
at least one polyurethane P comprising at least two NCO end functions;
at least one polyimine A obtained via a process comprising a step of reaction between at least:
  a) a (poly)urethane-aldehyde comprising at least 2 aldehyde functions;
  b) a primary diamine;
  c) optionally in the presence of a primary monoamine or a monoaldehyde if the —CHO/NH$_2$ molar ratio is other than 1;
or between:
i) a dihydroxyaldimine; and
ii) a (poly)isocyanate D chosen from isocyanates and polyurethanes comprising at least two NCO end functions;
iii) optionally in the presence of a monohydroxyaldimine or a monoisocyanate if the NCO/OH molar ratio is other than 1.

Polyurethane P

The polyurethane P comprising at least two NCO end functions can be obtained by any conventional method known to those skilled in the art. The polyurethane P is in particular obtained by polyaddition reaction between a composition of polyol(s) and a composition of polyisocyanate(s), optionally in the presence of a catalyst.

Polyol(s)

The abovementioned composition of polyol(s) can consist of a polyol or of a mixture of polyols.

The polyol(s) that can be used may be chosen from those having a molar mass or a number-average molecular weight (Mn) ranging from 60 g/mol to 22 000 g/mol, preferably from 600 g/mol to 18 000 g/mol, preferably from 1000 g/mol to 12 000 g/mol, preferably from 1000 to 8000 g/mol and more preferentially still from 1000 g/mol to 4000 g/mol.

The number-average molecular weight of the polyols can be calculated from the hydroxyl number (OHN), expressed in mg KOH/g, and from the functionality of the polyol or determined by methods well known to those skilled in the art, for example by size exclusion chromatography (or SEC) with PEG (polyethylene glycol) standard.

The polyols may have a hydroxyl functionality ranging from 2 to 6, preferably 2 to 3. In the context of the invention, and unless otherwise mentioned, the hydroxyl functionality of a polyol is the mean number of hydroxyl functions per mole of polyol.

The polyol(s) which can be used may be chosen from polyester polyols, polyether polyols, polydiene polyols, polycarbonate polyols, poly(ether-carbonate) polyols, OH-terminated prepolymers, and mixtures thereof.

The polyol(s) which can be used may be chosen from aliphatic polyols, arylaliphatic polyols, aromatic polyols, carbonate polyols and the mixtures of these compounds.

According to the invention, the polyester polyol(s) may have a number-average molecular weight ranging from 500 to 22 000 g/mol, preferably from 700 to 10 000 g/mol and more preferentially still from 900 to 6000 g/mol.

Among the polyester polyols, mention may for example be made of:
polyester polyols of natural origin, such as castor oil;
polyester polyols resulting from the condensation:
  of one or more aliphatic (linear, branched or cyclic) or aromatic polyols, such as, for example, ethanediol, 1,2-propanediol, 1,3-propanediol, glycerol, trimethylolpropane, 1,6-hexanediol, 1,2,6-hexanetriol, butenediol, cyclohexanedimethanol, sucrose, glucose, sorbitol, glycerol, trimethylolpropane, pentaerythritol, mannitol, triethanolamine, N-methyldiethanolamine and mixtures thereof, with
  one or more polycarboxylic acids or an ester or anhydride derivative thereof, such as 1,6-hexanedioic acid, dodecanedioic acid, azelaic acid, sebacic acid, adipic acid, 1,18-octadecanedioic acid, phthalic acid, succinic acid and the mixtures of these acids, an unsaturated anhydride, such as, for example, maleic or phthalic anhydride, or a lactone, such as, for example, caprolactone.

The abovementioned polyester polyols may be prepared conventionally and are for the most part commercially available.

Among the polyester polyols, mention may for example be made of the following products with a hydroxyl functionality equal to 2:

Tone® 0240 (sold by Union Carbide), which is a polycaprolactone with a number-average molecular weight of approximately 2000 g/mol and a melting point of approximately 50° C., Dynacoll° 7381 (sold by Evonik) with a number-average molecular weight of approximately 3500 g/mol and having a melting point of approximately 65° C., Dynacoll° 7360 (sold by Evonik), which results from the condensation of adipic acid with hexanediol and has a number-average molecular weight of approximately 3500 g/mol and a melting point of approximately 55° C., Dynacoll° 7330 (sold by Evonik) with a number-average molecular weight of approximately 3500 g/mol and having a melting point of approximately 85° C., Dynacoll° 7363 (sold by Evonik), which also results from the condensation of adipic acid with hexanediol and has a number-average molecular weight of approximately 5500 g/mol and a melting point of approximately 57° C., Dynacoll® 7250 (sold by Evonik): polyester polyol having a viscosity of 180 Pa·s at 23° C., a number-average molecular weight Mn equal to 5500 g/mol and a $T_g$ equal to −50° C., Kuraray® P-6010 (sold by Kuraray): polyester polyol having a viscosity of 68 Pa·s at 23° C., a number-average molecular weight equal to 6000 g/mol and a $T_g$ equal to −64° C., Kuraray® P-10010 (sold by Kuraray): polyester polyol having a viscosity of 687 Pa·s at 23° C. and a number-average molecular weight equal to 10 000 g/mol.

According to a preferred embodiment, the polyester polyol is chosen from: a polycaprolactone; castor oil; a polyester polyol resulting from the condensation of ethylene glycol, propylene glycol, 1,3-propanediol and/or 1,6-hexanediol with adipic acid and/or the various isomers of phthalic acid; and mixtures thereof.

According to the invention, the polyether polyol(s) may have a number-average molecular weight ranging from 200 to 22 000 g/mol, preferably from 600 to 18 000 g/mol, preferably from 1000 to 12 000 g/mol, preferably 1000 to 4000 g/mol and more preferentially still from 1000 to 8000 g/mol.

Preferably, the polyether polyol(s) has (have) a hydroxyl functionality ranging from 2 to 3.

The polyether polyol(s) which can be used according to the invention is (are) preferably chosen from polyoxyalkylene polyols, the linear or branched alkylene part of which comprises from 1 to 4 carbon atoms, preferably from 2 to 3 carbon atoms.

More preferentially, the polyether polyol(s) which can be used according to the invention is (are) preferably chosen from polyoxyalkylene diols or polyoxyalkylene triols and better still polyoxyalkylene diols, the linear or branched alkylene part of which comprises from 1 to 4 carbon atoms, preferably from 2 to 3 carbon atoms.

Mention may be made, as examples of polyoxyalkylene diols or triols which can be used according to the invention, for example, of:

polyoxypropylene diol or triol (also denoted by polypropylene glycol (PPG) diol or triol) having a number-average molecular weight ranging from 400 g/mol to 22 000 g/mol and preferably ranging from 400 g/mol to 12 000 g/mol, polyoxyethylene diol or triol (also denoted by polyethylene glycol (PEG) diol or triol) having a number-average molecular weight ranging from 400 g/mol to 22 000 g/mol and preferably ranging from 400 g/mol to 12 000 g/mol, polyoxybutylene glycol (also denoted by polybutylene glycol (PBG) diol or triol) having a number-average molecular weight ranging from 200 g/mol to 12 000 g/mol, PPG/PEG/PBG copolymer or terpolymer diol or triol having a number-average molecular weight ranging from 400 g/mol to 22 000 g/mol and preferably ranging from 400 g/mol to 12 000 g/mol, polytetrahydrofuran (PolyTHF) diol or triol having a number-average molecular weight ranging from 250 g/mol to 12000 g/mol, polytetramethylene glycols (PTMG) having a number-average molecular weight ranging from 200 g/mol to 12 000 g/mol, and mixtures thereof.

Preferably, the polyether polyol(s) which can be used is (are) chosen from polyoxypropylene diols or triols. The polyether polyols mentioned above can be prepared conventionally and are widely available commercially. They can, for example, be obtained by polymerization of the corresponding alkylene oxide in the presence of a catalyst based on a double metal/cyanide complex.

Mention may be made, as examples of polyether diols, of the polyoxypropylene diols sold under the name Acclaim® by Covestro, such as Acclaim® 18200, with a number-average molecular weight in the vicinity of 18 700 g/mol, Acclaim® 12200, with a number-average molecular weight in the vicinity of 11 335 g/mol, Acclaim® 8200, with a number-average molecular weight in the vicinity of 8057 g/mol, and Acclaim® 4200, with a number-average molecular weight in the vicinity of 4020 g/mol, or else of the polyoxypropylene diol sold under the name Voranol P2000 by Dow, with a number-average molecular weight in the vicinity of 2004 g/mol.

Mention may be made, as example of polyether triols, of the polyoxypropylene triol sold under the name Voranol CP3355 by Dow, with a number-average molecular weight in the vicinity of 3554 g/mol.

The polydiene polyol(s) which can be used according to the invention can preferably be chosen from polydienes comprising hydroxyl end groups, and the corresponding hydrogenated or epoxidized derivatives thereof.

Preferably, the polydiene polyol(s) which can be used according to the invention is (are) chosen from polybutadienes comprising hydroxyl end groups, which are optionally hydrogenated or epoxidized. Preferentially, the polydiene polyol(s) which can be used according to the invention is (are) chosen from butadiene homopolymers and copolymers comprising hydroxyl end groups, which are optionally hydrogenated or epoxidized.

In the context of the invention, and unless otherwise indicated, the "hydroxyl end groups" of a polydiene polyol are understood to mean the hydroxyl groups located at the ends of the main chain of the polydiene polyol.

The abovementioned hydrogenated derivatives may be obtained by complete or partial hydrogenation of the double bonds of a polydiene comprising hydroxyl end groups, and are thus saturated or unsaturated.

The abovementioned epoxidized derivatives may be obtained by chemoselective epoxidation of the double bonds of the main chain of a polydiene comprising hydroxyl end groups, and thus comprise at least one epoxy group in their main chain.

Mention may be made, as examples of polybutadiene polyols, of saturated or unsaturated butadiene homopolymers comprising hydroxyl end groups which are optionally epoxidized, such as, for example, those sold under the name Poly BD® or Krasol® by Cray Valley.

Mention may be made, as examples of polycarbonate diol, of Converge Polyol 212-10 and Converge Polyol 212-20 sold by Novomer, respectively with number-average molecular weights (Mn) equal to 1000 and 2000 g/mol, the hydroxyl numbers of which are respectively 112 and 56 mg KOH/g, Desmophen® C XP 2716 sold by Covestro, with a number-average molecular weight (Mn) equal to 326 g/mol, the hydroxyl number of which is 344 mg KOH/g, and Polyol C-590, C-1090, C-2090 and C-3090 sold by Kuraray, having a number-average molecular weight (Mn) ranging from 500 to 3000 g/mol and a hydroxyl number ranging from 224 to 37 mg KOH/g.

Polyisocyanate(s)

The abovementioned composition of polyisocyanate(s) can consist of a polyisocyanate or of a mixture of polyisocyanates.

The polyisocyanate(s) which can be used can be chosen from those typically used in the synthesis of an NCO-terminated polyurethane.

The polyisocyanate(s) which can be used can be aliphatic (linear or branched) or aromatic, and optionally substituted.

Preferably, the polyisocyanate(s) that can be used for the preparation of the polyurethane P is (are) chosen from diisocyanates, triisocyanates and mixtures thereof. According to one preferred embodiment, the polyisocyanate(s) is (are) chosen from the group consisting of isophorone diisocyanate (IPDI), pentamethylene diisocyanate (PDI), hexamethylene diisocyanate (HDI), heptane diisocyanate, octane diisocyanate, nonane diisocyanate, decane diisocyanate, undecane diisocyanate, dodecane diisocyanate, dicyclohexylmethane-4,4'-diisocyanate (4,4'-HMDI), norbornane diisocyanate, norbornene diisocyanate, cyclohexane-1,4-diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 2-methylpentane-1,5-diisocyanate (MPDI), 2,4,4-trimethylhexane-1,6-diisocyanate, 2,2,4-trimethylhexane-1,6-diisocyanate (TMDI), 4-(isocyanatomethyl)octane-1,8-diisocyanate (TIN), 2,5-bis(isocyanatomethyl)bicyclo[2.2.1]heptane (2,5-NBDI), 2,6-bis(isocyanatomethyl)bicyclo[2.2.1]heptane (2,6-NBDI), 1,3-bis(isocyanatomethyl)cyclohexane (1,3-H6-XDI), 1,4-bis(isocyanatomethyl)cyclohexane (1,4-H6-XDI), xylylene diisocyanate (XDI) (in particular m-xylylene diisocyanate (m-XDI)), toluene diisocyanate (in particular toluene-2,4-diisocyanate (2,4-TDI) and/or toluene-2,6-diisocyanate (2,6-TDI)), diphenylmethane diisocyanate (in particular diphenylmethane-4,4'-diisocyanate (4,4'-MDI) and/or diphenylmethane-2,4'-diisocyanate (2,4'-MDI)), tetramethylxylylene diisocyanate (TMXDI) (in particular tetramethyl-meta-xylylene diisocyanate), an HDI or PDI allophanate, for example having the following formulae (Y1) and (Y2):

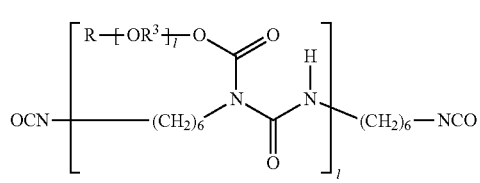

(Y1)

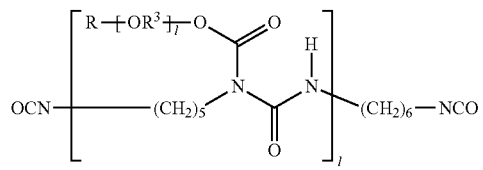

(Y2)

wherein i is an integer ranging from 1 to 2, j is an integer ranging from 0 to 9 and preferably 2 to 5, R represents a saturated or unsaturated, cyclic or acyclic, linear or branched, hydrocarbon chain comprising from 1 to 20 carbon atoms, preferably from 1 to 12 carbon atoms, 6 to 14 carbon atoms, and $R^3$ represents a linear or branched divalent alkylene group having from 2 to 4 carbon atoms and preferably a divalent propylene group; and mixtures thereof.

The MDI can be in the form of an isomer or of a mixture of isomers, such as 4,4'-MDI and/or 2,4'-MDI.

The TDI can be in the form of an isomer or of a mixture of isomers, such as 2,4-TDI and/or 2,6-TDI.

The polyisocyanate(s) which can be used to prepare the polyurethane used according to the invention are typically widely available commercially. By way of example, mention may be made of Scuranate® TX sold by Vencorex, corresponding to a 2,4-TDI with a purity of the order of 95%, Scuranate® T100 sold by Vencorex, corresponding to a 2,4-TDI with a purity of greater than 99% by weight, Desmodur® I sold by Covestro, corresponding to an IPDI, or else Isonate® M125 sold by Dow, corresponding to an MDI containing at least 97. The triisocyanates may be chosen from isocyanurates, biurets, and adducts of diisocyanates and of triols.

In particular, the isocyanurate(s) may be used in the form of a technical mixture of (poly)isocyanurate(s) with a purity of greater than or equal to 70% by weight of isocyanurate(s).

The diisocyanate isocyanurate(s) which can be used according to the invention can correspond to the following general formula (W):

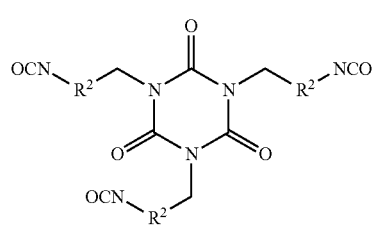

(W)

wherein:

$R^2$ represents a linear or branched, cyclic, aliphatic, arylaliphatic or aromatic alkylene group comprising from 4 to 9 carbon atoms, with the proviso that the NCO groups are not connected by a covalent bond to a carbon atom forming part of an aromatic hydrocarbon ring, such as a phenyl group.

As examples of diisocyanate trimers that may be used according to the invention, mention may be made of:

the isocyanurate trimer of hexamethylene diisocyanate (HDI):

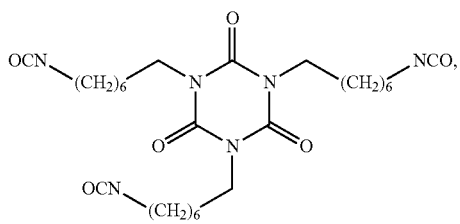

the isocyanurate trimer of isophorone diisocyanate (IPDI):

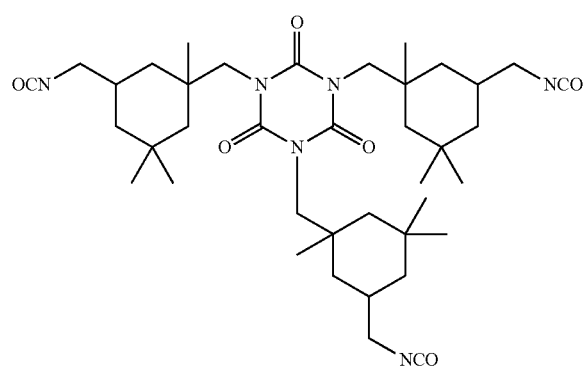

the isocyanurate trimer of pentamethylene diisocyanate (PDI):

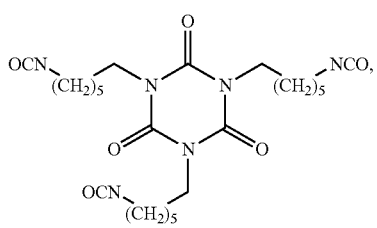

the isocyanurate trimer of meta-xylylene diisocyanate (m-XDI):

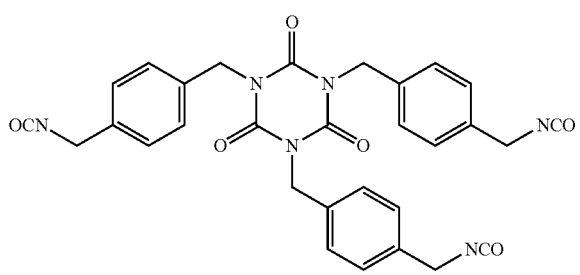

the isocyanurate trimer of m-XDI, in the hydrogenated form:

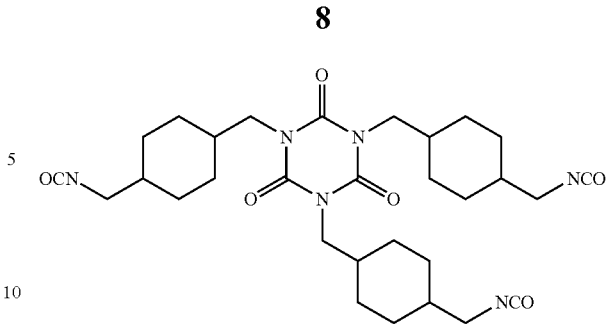

As examples of adducts of diisocyanates and of triols that may be used according to the invention, mention may be made of the adduct of meta-xylylene diisocyanate and of trimethylolpropane, as represented below. This adduct is sold, for example, by Mitsui Chemicals under the name Takenate® D-110N.

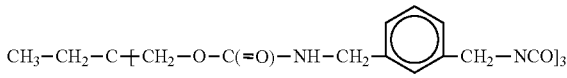

In the context of the invention, the expressions "polyaddition reaction" and "polyaddition" are equivalently understood.

The polyaddition step may be carried out at a temperature below 95° C., preferably ranging from 60° C. to 90° C., more preferentially ranging from 65° C. to 80° C.

The polyaddition step may be carried out under anhydrous conditions, for example under a nitrogen atmosphere.

The polyaddition step may be carried out in amounts of polyisocyanate(s) and of polyol(s) such that the NCO/OH molar ratio is strictly greater than 1, for example of between 1.1 and 2.5, preferably between 1.1 and 2.2, preferentially between 1.2 and 2.0, for example between 1.20 and 1.80, advantageously between 1.20 and 1.50, in particular between 1.30 and 1.40, so as to advantageously obtain an NCO-terminated polyurethane.

In the context of the invention, and unless otherwise mentioned, the NCO/OH molar ratio corresponds to the molar ratio of the number of isocyanate (NCO) groups to the number of hydroxyl (OH) groups respectively borne by the polyisocyanates and the polyols used.

The number-average molecular weight of the polyurethanes comprising at least two NCO functions can be measured by methods well known to those skilled in the art, for example by size exclusion chromatography (or SEC) using standards of polyethylene glycol type.

The polyurethane P comprising at least two NCO end groups can have a polydispersity index ranging from 1.5 to 3.5, preferably from 2.0 to 3.3.

In the context of the invention, the polydispersity index is defined as the $M_w$ (weight-average molecular weight)/$M_n$ (number-average molecular weight) ratio of the polyurethane.

The polyurethane P comprising at least two NCO end groups can have a weight content of NCO groups ranging from 0.1% to 6.0%, preferably from 0.5% to 5.0%, preferably from 1.0% to 4.0%, preferably from 1.5% to 3.0% and preferentially from 1.8% to 2.5%.

Polyimine A

The moisture-crosslinkable sealant composition according to the invention comprises at least one polyimine A obtained by a process comprising a step of reaction between at least:

a) a (poly)urethane-aldehyde comprising at least two aldehyde functions;
b) a primary diamine;
c) optionally in the presence of a monoamine or a monoaldehyde if the —CHO/—NH$_2$ molar ratio is other than 1.

Poly(urethane)-aldehyde a)

The (poly)urethane-aldehyde a) may be a urethane-aldehyde or a polyurethane-aldehyde.

The (poly)urethane-aldehyde a) may be obtained by reaction between:
at least one polyisocyanate C;
at least one hydroxyaldehyde.

The polyisocyanate C may be a monomeric, oligomeric or polymeric polyisocyanate comprising at least 2-NCO functions, preferentially only 2-NCO functions.

The polyisocyanate C may be chosen from triisocyanates, diisocyanates and polyurethanes comprising at least two NCO end functions.

Typically, when the polyisocyanate C is a diisocyanate or a triisocyanate, the product obtained is a urethane-aldehyde.

Typically, when the polyisocyanate C is a polyurethane comprising at least two -NCO end functions, the product obtained is a polyurethane-aldehyde.

Among the diisocyanates, mention may for example be made of isophorone diisocyanate (IPDI), hexamethylene diisocyanate (HDI), heptane diisocyanate, octane diisocyanate, nonane diisocyanate, decane diisocyanate, undecane diisocyanate, dodecane diisocyanate, dicyclohexylmethane-4,4'-diisocyanate (4,4'-HMDI), norbornane diisocyanate, norbornene diisocyanate, cyclohexane-1,4-diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 2-methylpentane-1,5-diisocyanate (MPDI), 2,4,4-trimethylhexane-1,6-diisocyanate, 2,2,4-trimethylhexane-1,6-diisocyanate (TMDI), 4-(isocyanatomethyl)octane-1,8-diisocyanate (TIN), 2,5-bis(isocyanatomethyl)bicyclo[2.2.1]heptane (2,5-NBDI), 2,6-bis(isocyanatomethyl)bicyclo[2.2.1]heptane (2,6-NBDI), 1,3-bis(isocyanatomethyl)cyclohexane (1,3-H6-XDI), 1,4-bis(isocyanatomethyl)cyclohexane (1,4-H6-XDI), xylylene diisocyanate (XDI) (in particular m-xylylene diisocyanate (m-XDI)), toluene diisocyanate (in particular toluene-2,4-diisocyanate (2,4-TDI) and/or toluene-2,6-diisocyanate (2,6-TDI)), diphenylmethane diisocyanate (in particular diphenylmethane-4,4'-diisocyanate (4,4'-MDI) and/or diphenylmethane-2,4'-diisocyanate (2,4'-MDI)), tetramethylxylylene diisocyanate (TMXDI) (in particular tetramethyl-meta-xylylene diisocyanate), an HDI or PDI allophanate, for example having the following formulae (Y1) and (Y2):

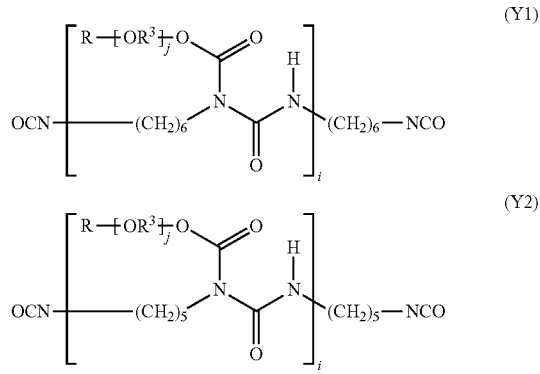

wherein i is an integer ranging from 1 to 2, j is an integer ranging from 0 to 9 and preferably 2 to 5, R represents a saturated or unsaturated, cyclic or acyclic, linear or branched, hydrocarbon chain comprising from 1 to 20 carbon atoms, preferably from 1 to 12 carbon atoms, 6 to 14 carbon atoms, and $R^1$ represents a linear or branched divalent alkylene group having from 2 to 4 carbon atoms and preferably a divalent propylene group; and mixtures thereof.

Preferably, the allophanate of abovementioned formula (Y1) is such that p, q, R and $R^3$ are chosen such that the above HDI allophanate derivative comprises a content of isocyanate NCO groups ranging from 12% to 14% by weight, relative to the weight of said derivative.

The triisocyanates may be chosen from isocyanurates, biurets, and adducts of diisocyanates and triols.

In particular, the isocyanurate(s) may be used in the form of a technical mixture of (poly)isocyanurate(s) with a purity of greater than or equal to 70% by weight of isocyanurate(s).

The diisocyanate isocyanurate(s) which can be used according to the invention can correspond to the following general formula (W):

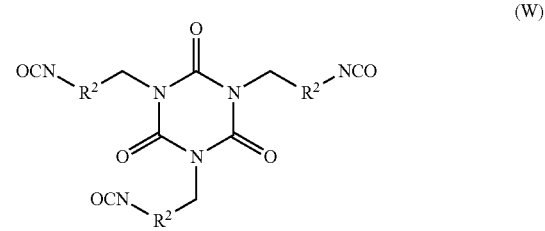

wherein:

$R^2$ represents a linear or branched, cyclic, aliphatic, arylaliphatic or aromatic alkylene group comprising from 4 to 9 carbon atoms, with the proviso that the NCO groups are not connected by a covalent bond to a carbon atom forming part of an aromatic hydrocarbon ring, such as a phenyl group.

As examples of diisocyanate trimers that may be used according to the invention, mention may be made of:

the isocyanurate trimer of hexamethylene diisocyanate (HDI):

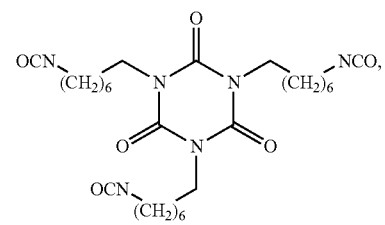

the isocyanurate trimer of isophorone diisocyanate (IPDI):

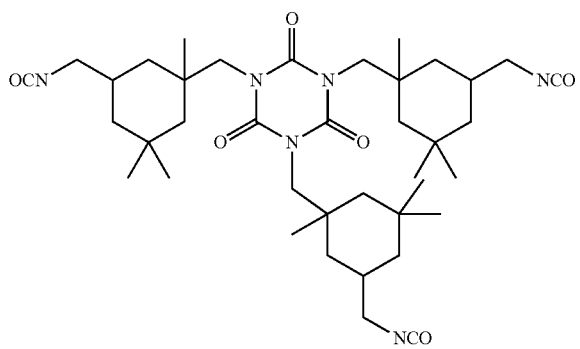

the isocyanurate trimer of pentamethylene diisocyanate (PDI):

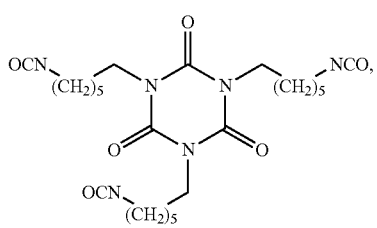

the isocyanurate trimer of meta-xylylene diisocyanate (m-XDI):

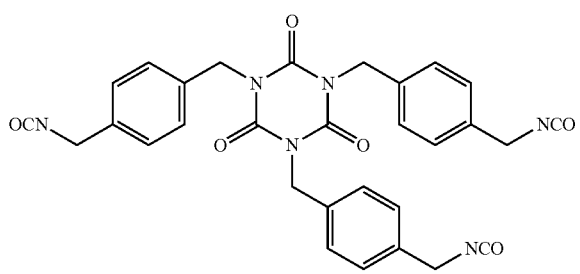

the isocyanurate trimer of m-XDI, in the hydrogenated form:

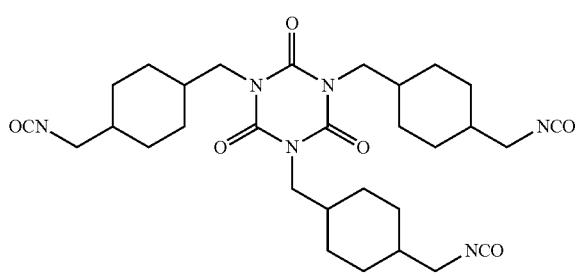

As examples of adducts of diisocyanates and of triols that may be used according to the invention, mention may be made of the adduct of meta-xylylene diisocyanate and of trimethylolpropane, as represented below. This adduct is sold, for example, by Mitsui Chemicals, Inc. under the name Takenate® D-110N.

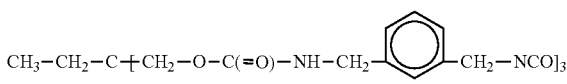

The polyisocyanates C can be polyurethanes comprising at least two NCO end functions. Polyurethanes comprising at least two end functions can be obtained by a typical process that reacts at least one polyol with at least one polyisocyanate. Such polyurethanes can be prepared by a process comprising a polyaddition reaction E1):
i) of at least one polyisocyanate, preferably chosen from diisocyanates, triisocyanates and their mixtures;
(ii) with at least one polyol preferably chosen from polyether polyols, polydiene polyols, polycarbonate polyols, polyester polyols, and mixtures thereof;
in amounts such that the NCO/OH molar ratio (r1) is strictly greater than 1, preferably ranges from 1.6 to 1.9 and preferentially ranges from 1.65 to 1.85.

In the context of the invention, and unless otherwise mentioned, (r1) is the NCO/OH molar ratio corresponding to the molar ratio of the number of isocyanate (NCO) groups to the number of hydroxyl (OH) groups borne by all of the polyisocyanate(s) and polyol(s) present in the reaction medium of step E1).

When the NCO-terminated polyurethane is obtained during step E1) from a mixture of polyisocyanates or of several polyisocyanates added successively, the calculation of the ratio (r1) takes into account firstly the NCO groups borne by all of the polyisocyanates present in the reaction medium of step E1), and secondly the OH groups borne by the polyol(s) present in the reaction medium of step E1).

During step E1), the polyaddition reaction is performed at a temperature preferably below 95° C., and preferably under anhydrous conditions.

The polyols of step E1) may be those mentioned above for the preparation of the polyurethane P according to the invention. All the preferred embodiments and modes apply to the polyols which can be used for the preparation of the polyurethane comprising at least two NCO functions.

The polyisocyanates that can be used in step E1) may be the diisocyanates and triisocyanates mentioned above for the preparation of the polymeric polyisocyanate.

According to one preferred embodiment, step E1) uses at least one diisocyanate, and notably at least one HDI allophanate having for example the abovementioned formula (Y1).

The polyisocyanates that can be used according to the invention are widely available commercially. By way of example, mention may be made of Scuranate® TX sold by Vencorex, corresponding to a 2,4-TDI with a purity of the order of 95%, Scuranate® T100 sold by Vencorex, corresponding to a 2,4-TDI with a purity of greater than 99% by weight, Desmodur® I sold by Covestro, corresponding to an IPDI, Takenate™ 500 sold by Mitsui Chemicals, corresponding to an m-XDI, Takenate™ 600 sold by Mitsui Chemicals, corresponding to an m-H6XDI, Vestanat® H12MDI sold by Evonik, corresponding to an H12MDI, or else those from the Tolonate® series sold by Vencorex, such as Tolonate® X FLO 100, corresponding to an HDI allophanate derivative of formula (Y1).

Preferably, the (poly)urethane-aldehyde a) is a (poly)urethane-dialdehyde.

Preferably, the (poly)urethane-dialdehyde a) comprises an allophanate radical.

Preferably, the (poly)urethane-dialdehyde a) is obtained by reaction between:
- at least one polyisocyanate C comprising at least one allophanate radical; and
- at least one hydroxyaldehyde.

More preferably still, at least one polyisocyanate C is the HDI allophanate having in particular the abovementioned formula (Y1).

The hydroxyaldehydes may have the following formula (A):

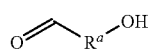
(A)

wherein $R^a$ represents a linear or branched, saturated or unsaturated, divalent hydrocarbon radical comprising from 2 to 65 carbon atoms, it being possible for said radical to optionally comprise one or more heteroatoms.

In the context of the invention, the expression "hydrocarbon radical which may contain heteroatoms" means that the radical may contain a heteroatom either in the form of a function such as for example a carbonyl —C(=O) function, an amide —C(=O)—NH— or ester —C(=O)—O—/—OC(=O)— function, or else —OC(=O)—NH—, —OR or —NR— function, or else in the form of a heteroatom such as for example —O—, —NH— or —S—.

The hydroxyaldehydes may in particular have the following formula:

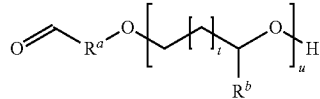

wherein $R^a$ represents a linear or branched, saturated or unsaturated, divalent hydrocarbon radical comprising from 2 to 65 carbon atoms, it being possible for said radical to optionally comprise one or more heteroatoms; $R^b$ represents H or a linear or branched alkyl radical comprising from 1 to 7 carbon atoms, preferentially from 1 to 3 carbon atoms; u represents an integer ranging from 1 to 380, preferably from 1 to 210, more preferentially from 1 to 140, and more preferentially still from 1 to 10; and t represents an integer ranging from 0 to 18, preferentially from 0 to 12, more preferably from 0 to 6, and more preferentially still from 0 to 2.

The hydroxyaldehydes of formula (A) may have one of the following formulae:

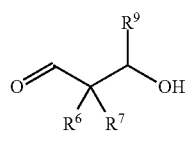
(A-1)

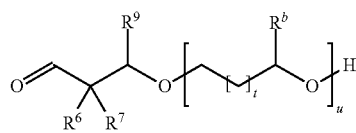
(A-2)

with $R^6$ and $R^7$ each representing, independently of one another, a monovalent hydrocarbon radical comprising from 1 to 12 carbon atoms, or $R^6$ and $R^7$ together form an aliphatic ring comprising from 4 to 12 carbon atoms, said ring being optionally substituted; $R^9$ representing a hydrogen, a linear or branched alkyl radical, a cycloalkyl radical, an arylalkyl radical, or an alkoxycarbonyl radical comprising from 1 to 12 carbon atoms; $R^b$ represents H or a linear or branched alkyl radical comprising from 1 to 7 carbon atoms, preferentially from 1 to 3 carbon atoms; u represents an integer ranging from 1 to 380, preferably from 1 to 210, more preferentially from 1 to 140, and more preferentially still from 1 to 10; and t represents an integer ranging from 0 to 18, preferentially from 0 to 12, more preferably from 0 to 6, and more preferentially still from 0 to 2.

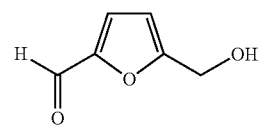
(A-3)

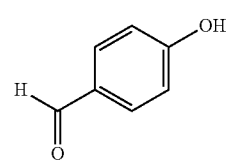
(A-4)

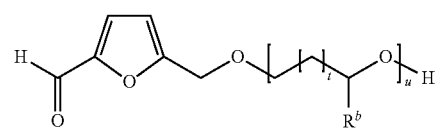
(A-5)

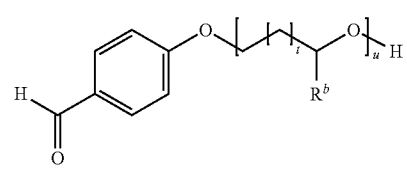
(A-6)

wherein:
- t is an integer ranging from 0 to 18, preferentially from 0 to 12, preferably 0 to 6, more preferably still from 0 to 2;
- u represents an integer ranging from 1 to 380, preferably from 1 to 210, more preferentially from 1 to 140, and more preferentially still from 1 to 10; and t represents an integer ranging from 0 to 18, preferentially from 0 to 12, more preferably from 0 to 6, and more preferentially still from 0 to 2;
- $R^b$ represents H or an alkyl radical ranging from 1 to 7 carbon atoms, preferentially from 1 to 3 carbon atoms.

Among the hydroxyaldehydes of formula (A-1), mention may for example be made of 2,2-dimethyl-3-hydroxypropanal, 2-(hydroxymethyl)-2-methylbutanal, 2-(hydroxymethyl)-2-ethylbutanal, 2-(hydroxymethyl)-2-methylpentanal, 2-(hydroxymethyl)-2-ethylhexanal, 1-(hydroxymethyl) cyclopentanecarboxaldehyde, 1-(hydroxymethyl) cyclohexanecarboxaldehyde, 3-hydroxy-2-methyl-2-phenylpropanal and 3-hydroxy-2,2-diphenylpropanal.

According to one embodiment, the hydroxyaldehydes are chosen from the group consisting of 7-hydroxy-3,7-dimethyloctanal (CAS number: 107-75-5), 9-hydroxy-5,9-dimethyldec-4-enal (CAS number: 926-50-1), 4-hydroxybenzaldehyde (CAS number: 123-08-0), 5-(hydroxymethyl)furfural, 3-hydroxy-2,2-dimethylpropanal (CAS number: 597-31-9), and mixtures thereof.

According to one embodiment, the (poly)urethane-aldehyde is a (poly)urethane-dialdehyde which is obtained by reaction between:
a) at least one polyisocyanate C comprising at least one allophanate radical;
b) at least one hydroxyaldehyde;
in amounts such that the NCO/OH molar ratio (r2) ranges from 0.95 to 1.05, preferably is equal to 1.

According to one embodiment, the (poly)urethane-aldehyde a) has one of the following formulae (I) or (II):

wherein i is an integer ranging from 1 to 2, j is an integer ranging from 0 to 9, and preferably 2 to 5, r is an integer ranging from 1 to 10, R represents a saturated or unsaturated, cyclic or acyclic, linear or branched, hydrocarbon chain comprising from 1 to 20 carbon atoms, preferably from 1 to 12 carbon atoms, or 6 to 14 carbon atoms, and $R^3$ represents a linear or branched divalent alkylene group having from 2 to 4 carbon atoms and preferably a divalent propylene group;

$R^4$ represents a divalent hydrocarbon radical derived from a polyol by replacement of each of the two hydroxyl groups with a free valency;

v is an integer such that the number-average molecular weight of the polyether block of formula —$[OR^4]_v$— ranges from 60 g/mol to 22 000 g/mol, preferably from 600 g/mol to 18 000 g/mol, preferably 1000 g/mol to 12

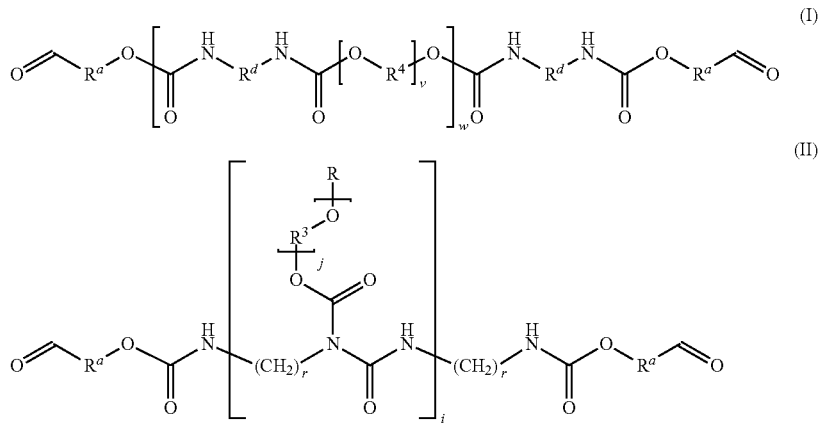

wherein:
$R^a$ is as defined above;
$R^d$ represents the following radical:

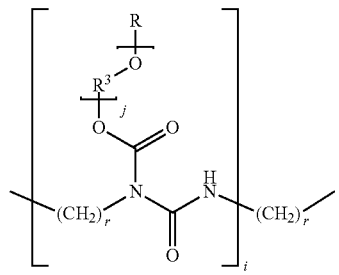

000 g/mol, preferably from 1000 to 8000 g/mol and more preferentially still from 1000 g/mol to 4000 g/mol;

w is an integer such that the number-average molecular weight (Mn) of the (poly)urethane-dialdehyde of formula (I) ranges from 500 g/mol to 22 000 g/mol, preferably from 500 g/mol to 18 000 g/mol, more preferably from 500 g/mol to 12 000 g/mol, and more preferentially still from 600 g/mol to 5000 g/mol.

Among the compounds of formula (II), mention may be made, for example, of the compounds of the following formulae:

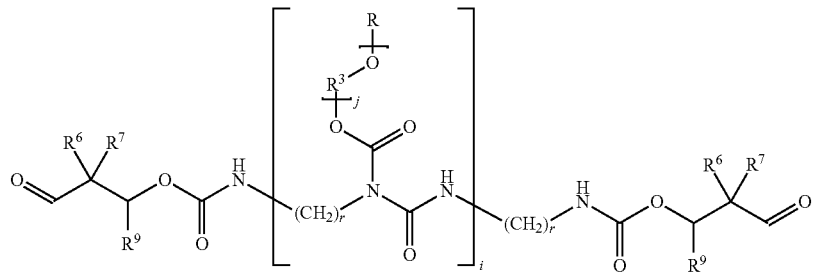

-continued

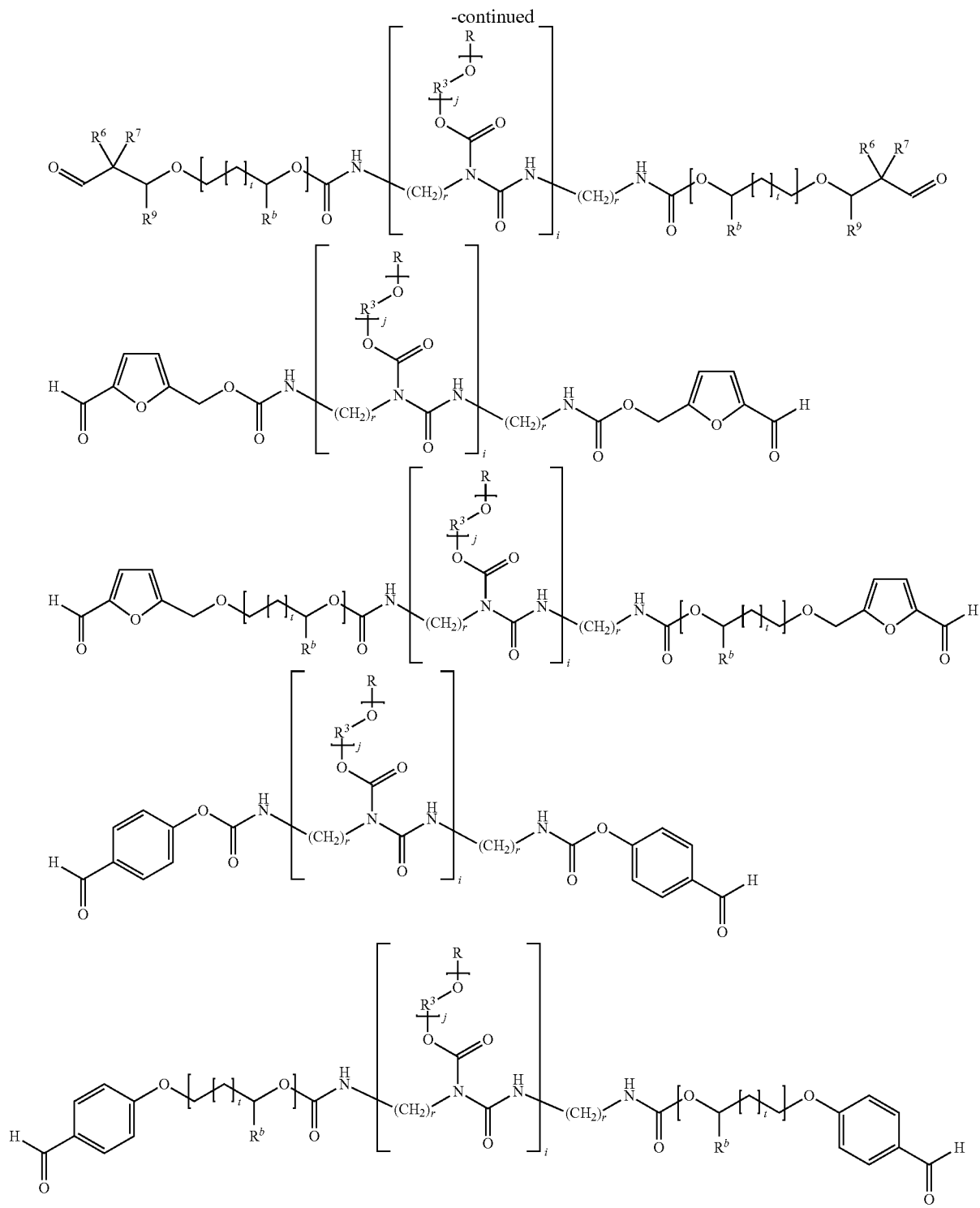

wherein R, $R^b$, $R^3$, r, t, u, i, j, $R^6$, $R^7$ and $R^9$ are as defined above.

Primary Diamine b)

In the context of the invention, and unless otherwise mentioned, the term "primary diamine" is understood to mean an amine comprising within its structure only two —$NH_2$ groups. The primary diamines may have the following general formula:

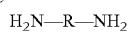

wherein R represents an organic radical without an additional —$NH_2$ group.

The primary diamines preferably have a number-average molecular weight (Mn) greater than or equal to 60 g/mol, preferably greater than or equal to 140 g/mol, preferentially greater than or equal to 200 g/mol, advantageously greater than or equal to 500 g/mol.

According to one embodiment, the primary diamine is chosen from the group consisting of linear or branched aliphatic amines; aliphatic polyamines; polyetheramines; polyamidoamines; dimer fatty amines; derivatives of diamino acids such as, for example, the diamino ester or diaminoamide derivatives thereof; amines of the following formula (B): $H_2N\text{—}CH_2\text{—}Z\text{—}CH_2NH_2$ wherein Z represents a linear or branched, cyclic, aliphatic or aromatic, saturated or unsaturated divalent hydrocarbon radical, preferably comprising from 1 to 38 carbon atoms, said hydrocarbon radical being optionally interrupted by one or more heteroatoms chosen from —S—, —O— and/or one or more tertiary amine divalent groups —NR'— with R' representing a linear or branched, saturated or unsaturated alkyl group, comprising 1 to 22 carbon atoms, preferably from 1 to 18, preferably from 1 to 14, preferentially from 1 to 10 and advantageously from 1 to 6 carbon atoms;
and mixtures thereof.

Among the primary diamines of formula (B), mention may for example be made of 1,6-hexamethylenediamine (NMDA), 1,10-decanediamine: $H_2N\text{—}(CH_2)_{10}\text{—}NH_2$, 1,12-dodecanediamine: $H_2N\text{—}(CH_2)_{12}\text{—}NH_2$, the polyetherdiamines of formulae $H_2N\text{—}CH_2\text{—}CH_2\text{—}O\text{—}CH_2\text{—}CH_2\text{—}O\text{—}CH_2\text{—}CH_2\text{—}NH_2$ and $H_2N\text{—}CH_2\text{—}CH_2\text{—}O\text{—}CH_2\text{—}CH_2\text{—}O\text{—}CH_2\text{—}CH_2\text{—}CH_2\text{—}NH_2$ (available, for example, under the respective trade names Jeffamine® EDR 148 and Jeffamine® EDR 176 from Huntsman) and also According to one embodiment, the primary diamine is chosen from the polyetheramines of following formula (C) $H_2N\text{—}CH(Me)\text{—}Z'\text{—}CH(Me)NH_2$ wherein Z' represents Z as defined above, in particular chosen from:
polyetherdiamines, such as, for example:
polyetherdiamines corresponding to the formula below:

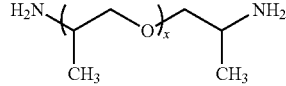

wherein x is an integer such that the primary alkalinity of the polyetherdiamine is between 0.5 and less than 10 meq/g, x preferably ranging from 2 to 68 (such polyetherdiamines are sold, for example, under the name Jeffamines D-230, D-400, D-2000 and D-4000 by Huntsman and have respective primary alkalinities of 8.7, 5.0, 1.0 and 0.5 meq/g);
polyetherdiamines corresponding to the formula below:

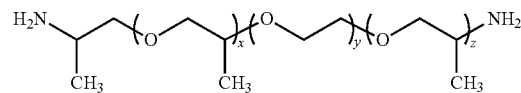

wherein x, y and z are integers such that the primary alkalinity is between 1 and less than 10 meq/g, y preferably ranging from 2 to 39 and x+z ranging from 1 to 6 (such polyetherdiamines are sold, for example, under the name Jeffamines HK-511, ED-600, ED-900 and ED-2003 by Huntsman and have respective primary alkalinities of 9.1, 3.3, 2.2 and 1.0 meq/g);
polyetherdiamines corresponding to the following formula:

$H_2N\text{—}X_b(\text{—}O\text{—}X_b)_{m-1}\text{—}O\text{—}(CH_2\text{—}CH_2\text{—}CH_2\text{—}CH_2\text{—}O)_n\text{—}(X_b\text{—}O)_{m-1}\text{—}X_b\text{—}NH_2$ wherein $X_b$ is a linear or branched alkylene group preferably comprising from 2 to 20 carbon atoms, preferably from 2 to 10 carbon atoms, m is an integer ranging from 1 to 20 and n is an integer ranging from 1 to 100, m and n preferably being such that the primary alkalinity of the polyetherdiamines is strictly less than 10 meq/g.

According to another embodiment, the primary diamine is chosen from fatty amine dimers comprising two primary amine groups with a primary alkalinity ranging from 3.28 meq/g to 5.20 meq/g. These fatty amine dimers may be obtained from corresponding dimerized fatty acids. Mention may be made, as examples of such partially or completely hydrogenated fatty amine dimers, of those corresponding to the following formulae:

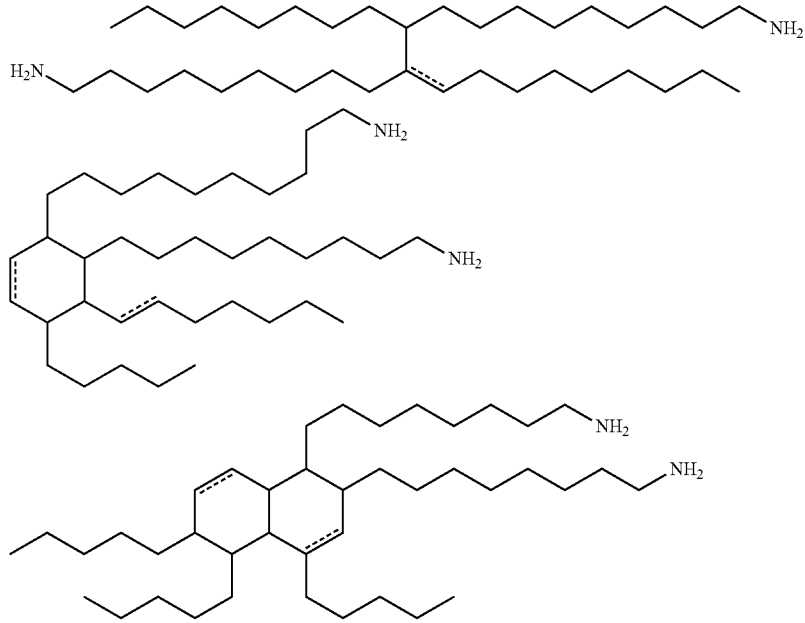

The fatty acid dimers used to prepare the abovementioned fatty amines may be obtained by high-temperature polymerization under pressure of unsaturated monocarboxylic fatty acids (monomeric acid) comprising from 6 to 22 carbon atoms, preferably from 12 to 20 carbon atoms, and originate from plant or animal sources. Mention may be made, as examples of such unsaturated fatty acids, of $C_{18}$ acids having one or two double bonds (respectively oleic acid or linoleic acid) obtained from tall oil, which is a byproduct of the manufacture of paper pulp. After polymerization of these unsaturated fatty acids, a technical mixture is notably obtained which contains, on average, 30-35% by weight of monocarboxylic fatty acids, often isomerized, relative to the starting unsaturated monocarboxylic fatty acids, 60-65% by weight of dicarboxylic acids (dimeric acids) comprising twice the carbon number relative to the starting unsaturated monocarboxylic fatty acids, and 5-10% by weight of tricarboxylic acids (trimeric acids) containing three times the carbon number relative to the starting unsaturated monocarboxylic fatty acids. The different commercial grades of acid dimers, monomers or trimers are obtained in particular by purification of this mixture. These fatty acid dimers and trimers are subsequently typically subjected to a reductive ammoniation ($NH_3/H_2$) reaction in the presence of a catalyst, making it possible to obtain the dimerized fatty amines.

According to another embodiment, the primary diamine is chosen from polyamines, preferably having a molar mass ranging from 117 to 400 g/mol.

Mention may for example be made of N-methyl-2,2'-diaminodiethylamine (CAS number: 4097-88-5) and N-bis(3-aminopropyl)methylamine (CAS number: 105-83-9) sold by BASF, N,N-bis(3-aminopropyl)dodecylamine (CAS number: 2372-82-9) available from LONZA and GLOBAL AMINES, and N,N-bis(3-aminopropyl)octadecylamine (CAS number: 273925-74-9).

The derivatives of diamino acids may have the following formula (III):

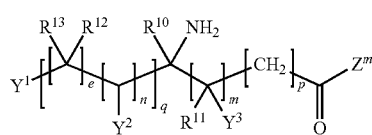

(III)

wherein:
$Y^1$ represents $F^1$ or —$NH_2$;
$U^2$ represents $F^2$ or —$NH_2$;
$Y^3$ represents $F^3$ or —$NH_2$;
provided that at least one of the radicals $Y^1$, $Y^2$ or $Y^3$ represents —$NH_2$;
provided that when $Y^1$=—$NH_2$, then q=1;
provided that when $Y^1$=—$NH_2$, then $Y^2$=$F^2$ and $Y^3$=$F^3$;
provided that when $Y^2$=—$NH_2$, then $Y^1$=$F^1$ and $Y^3$=$F^3$;
provided that when $Y^3$=—$NH_2$, then $Y^1$=$F^1$ and $Y^2$=$F^2$;

$F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)$NH_2$ group, an —SMe group, or a guanidyl group of formula —NH—C(=NH)—$NH_2$, $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)$NH_2$ group, an —SMe group, or a guanidyl group of formula —NH—C(=NH)—$NH_2$, $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)$NH_2$ group, an —SMe group, or a guanidyl group of formula —NH—C(=NH)—$NH_2$, $R^{10}$, $R^{11}$, $R^{12}$ and $R^{13}$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 5 to 12 carbon atoms;

$Z^m$ represents a monovalent organic radical having a molar mass or a number-average molecular weight (Mn) ranging from 16 to 22 000 g/mol, preferably from 16 to 12 000 g/mol, more preferably from 16 to 8000 g/mol, more preferentially still from 16 to 4000 g/mol;

n is an integer ranging from 0 to 28;

m represents 0 or 1;

p is an integer ranging from 0 to 10;

q represents 0 or 1;

e is an integer ranging from 1 to 3.

Preferably, in the formula (III), $Z^m$ represents a radical chosen from —$OR^5$, —$NH_2$, —NH—R' or —N(R')(R"), wherein:

$R^5$ represents a linear or branched alkyl group comprising from 1 to 60 carbon atoms which may optionally comprise one or more heteroatoms, a (hetero)cycloalkyl group comprising from 3 to 20 carbon atoms, an arylalkyl group comprising from 7 to 20 carbon atoms, or a (hetero)aryl group comprising from 4 to 12 carbon atoms;

R' represents a linear or branched alkyl group comprising from 1 to 60 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms;

R" represents a linear or branched alkyl group comprising from 1 to 60 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms. It being possible for R' and R" to form an aliphatic ring comprising from 4 to 12 carbon atoms, said ring optionally comprising one or more heteroatoms.

The derivatives of diamino acids of formula (III) may correspond to the following formula (III-A):

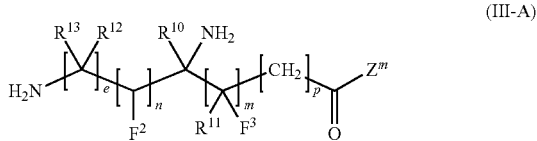

(III-A)

wherein $R^{10}$, $R^{11}$, $R^{12}$ and $R^{13}$, $F^2$, $F^3$, n, m, p and e are as defined above in formula (III).

The compounds of formula (III-A) may be in the form of an L enantiomer, of a D enantiomer or in the form of a racemate.

Among the compounds of formula (III-A), mention may for example be made of lysine and homolysine.

The compounds of formula (III) may be those corresponding to the following formula (III-B):

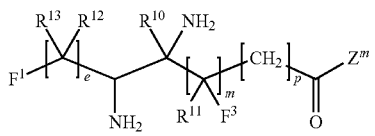

(III-B)

wherein $R^{10}$, $R^{11}$, $R^{12}$ and $R^{13}$, $F^1$, $F^3$, m, p and e are as defined above in formula (III).

The compounds of formula (III-B) may be in the form of an L enantiomer, of a D enantiomer or in the form of a racemate.

Among the compounds of formula (III-B), mention may for example be made of 3-aminonorvaline (CAS: 80573-35-9), α,β-diaminobenzenebutanoic acid (CAS: 70984-76-8) and 2,3-diaminobutanoic acid (CAS: 2643-66-5).

The compounds of formula (III) may also correspond to the following formula (III-C):

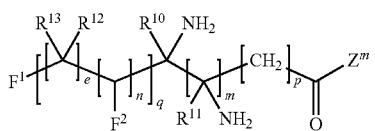

(III-C)

wherein $R^{10}$, $R^{11}$, $R^{12}$ and $R^{13}$, $F^1$, $F^2$, n, p, q and e are as defined above in formula (III).

The compounds of formula (III-C) may be in the form of an L enantiomer, of a D enantiomer or in the form of a racemate.

Among the compounds of formula (III-C), mention may for example be made of 2,3-diaminopropionic acid (CAS: 515-94-6) and 3,4-diaminobutanoic acid (CAS: 131530-16-0) and β-aminophenylalanine (CAS: 64765-83-9).

Preferably, the primary diamines are chosen from polyetheramines, fatty amine dimers, and mixtures thereof.

Primary Monoamine c)

In the context of the invention, and unless otherwise mentioned, the term "primary monoamine" is understood to mean an amine comprising within its structure only one primary —$NH_2$ function.

The molar masses or number-average molecular weights (Mn) can range from 95 g/mol to 2000 g/mol, preferably from 180 g/mol to 2000 g/mol, and more preferentially from 500 to 2000 g/mol.

The primary monoamines c) can be chosen from the group consisting of 2-ethyl-1-hexylamine (CAS: 104-75-6), 1-aminoheptane (CAS: 1-aminoheptane), 2-aminoheptane (CAS: 123-82-0), 2-amino-6-methylheptane (CAS: 543-82-8), benzylamine (CAS: 100-46-9), furfurylamine (CAS: 617-89-0), 1-aminooctane (CAS: 111-86-4), 2-aminooctane (CAS: 693-16-3), 1-aminononane (CAS: 112-20-9), 1-aminodecane (CAS: 2016-57-1), 1-aminoundecane (CAS: 7307-55-3), 1-aminododecane (CAS: 124-22-1), 1-aminotridecane (CAS: 2869-34-3), 1-aminotetradecane (CAS: 2016-42-4), 1-aminopentadecane (CAS: 2570-26-5), 1-aminohexadecane (CAS: 143-27-1), 1-aminooctadecane (CAS: 124-30-1), 1-aminoeicosane (CAS: 10525-37-8), coconut oil primary fatty amines (CAS: 61788-46-3) such as for example NORAM® C from ARKEMA, tallow primary fatty amines (CAS: 161544-60-1) such as NORAM® S from ARKEMA, oleyl primary fatty amines (CAS: 112-90-3) such as for example NORAM® O from ARKEMA, polyetheramine monoamines such as for example JEFFAMINE M products from HUNTSMAN; and mixtures thereof.

Monoaldehyde c)

In the context of the invention, and unless otherwise mentioned, the term "monoaldehyde" is understood to mean an aldehyde comprising within its structure only one —CHO aldehyde function.

The monoaldehyde may have the following formula (IV):

(IV)

wherein $G^1$ represents a linear or branched, saturated or unsaturated, monovalent hydrocarbon radical comprising from 2 to 65 carbon atoms, it being possible for said radical to optionally comprise one or more heteroatoms.

In the context of the invention, the expression "hydrocarbon radical which may contain heteroatoms" means that the radical may contain a heteroatom either in the form of a function such as for example a carbonyl —C(=O) function, an amide —C(=O)—$NH_2$— or ester —C(=O)—O—/—OC(=O)— function, or else —OC(=O)—NH—, —OR or —NRR' function, or else in the form of a heteroatom such as for example —O—, —NH— or —S—.

The $G^1$ radical may represent a —$C(R^6)(R^7)(R^8)$ radical or a -$G^2$ radical with:

$R^6$ and $R^7$ each representing, independently of one another, a monovalent hydrocarbon radical comprising from 1 to 12 carbon atoms, said radical being optionally substituted by an —OH group;

or $R^6$ and $R^7$ together form an aliphatic ring comprising from 4 to 12 carbon atoms, said ring being optionally substituted;

$R^8$ represents a monovalent hydrocarbon radical comprising from 1 to 60 carbon atoms, said radical optionally comprising a heteroatom;

$G^2$ represents an optionally substituted heteroaryl radical, or a —$C(0)$-$R^{12}$ radical with $R^{12}$ representing an alkoxy radical, an alkenyl radical, or an arylalkenyl radical comprising at least 6 carbon atoms, said $G^2$ radical having a molar mass or a number-average molecular weight (Mn) ranging from 15 to 4000 g/mol, preferably ranging from 60 to 2000 g/mol, preferentially ranging from 60 to 1000 g/mol and more preferentially still ranging from 60 to 500 g/mol.

The compounds of formula (IV) may have one of the following formulae (IV-A) or (IV-B):

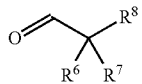
(IV-A)

wherein:
- $R^6$ and $R^7$ each represent, independently of one another, a monovalent hydrocarbon radical comprising from 1 to 12 carbon atoms, said radical being optionally substituted by an —OH group;
- or $R^6$ and $R^7$ together form an aliphatic ring comprising from 4 to 12 carbon atoms, said ring being optionally substituted;
- $R^8$ represents a monovalent hydrocarbon radical comprising from 1 to 60 carbon atoms, said radical optionally comprising a heteroatom;

(IV-B)

wherein $G^2$ represents an optionally substituted heteroaryl radical, or a —C(O)—$R^{12}$ radical with $R^{12}$ representing an alkoxy radical, an alkenyl radical, or an arylalkenyl radical comprising at least 6 carbon atoms,
said $G^2$ radical having a molar mass or a number-average molecular weight (Mn) ranging from 15 to 4000 g/mol, preferably ranging from 60 to 2000 g/mol, preferentially ranging from 60 to 1000 g/mol and more preferentially still ranging from 60 to 500 g/mol.

According to one embodiment, $G^2$ represents a heteroaryl radical substituted by at least one radical chosen from —$OR^{25}$, O—C(=O)—$NHR^{23}$, O—C(=O)$R^{24}$, —$CH_2$—O—$OR^{20}$, —$CH_2$—O—C(=O)—$R^{21}$, —$COOR^{17}$, C(=O)—$NR^{14}R^{15}$ and —$CH_2$—O—C(=O)—$NHR^{22}$, with $R^{25}$, $R^{20}$, $R^{21}$, $R^{22}$, $R^{23}$ and $R^{24}$ representing, independently of one another, a linear or branched, cyclic or non-cyclic, saturated or unsaturated alkyl group, a hydrogen atom, or an aryl group; $R^{17}$ representing a linear or branched alkyl radical or a (hetero)aryl radical, or an arylalkyl radical; $R^{14}$ and $R^{15}$ each representing, independently of one another, a hydrogen, a linear or branched alkyl radical, a cycloalkyl radical, or an arylalkyl radical or $R^{14}$ and $R^{15}$ together form an aliphatic ring comprising from 4 to 12 carbon atoms, said ring being optionally substituted and optionally comprising one or more heteroatoms.

Preferably, the compounds of formula (IV-A) are those for which:
- $R^6$ and $R^7$ each represent, independently of one another, a linear or branched alkyl radical comprising from 1 to 12 carbon atoms, said radical being optionally substituted by an —OH group; and/or
- $R^8$ represents one of the following radicals:
    - a —$CH_2$—W radical wherein W represents an optionally substituted aryl group or an optionally substituted heterocycloalkyl, or
    - a —CH($R^9$)—O—$R^{10}$ radical wherein $R^9$ represents a hydrogen, a linear or branched alkyl radical, a cycloalkyl radical, an arylalkyl radical, or an alkoxycarbonyl radical comprising from 1 to 12 carbon atoms; and $R^{10}$ represents a hydrogen or a hydrocarbon radical comprising from 1 to 30 carbon atoms, said radical optionally comprising one or more oxygen atoms; or
    - a —CH($R^9$)—O—C(O)—$R^{11}$ radical wherein $R^9$ represents a hydrogen, a linear or branched alkyl radical, a cycloalkyl radical, an arylalkyl radical, or an alkoxycarbonyl radical comprising from 1 to 12 carbon atoms; and $R^{11}$ represents a hydrogen or a linear or branched alkyl radical comprising from 1 to 30 carbon atoms, said alkyl radical optionally comprising cyclic portions and optionally at least one heteroatom; or
    - a —CH($R^{13}$)—$NR^{14}R^{15}$ radical wherein $R^{13}$ represents a hydrogen, a linear or branched alkyl radical, a cycloalkyl radical, an arylalkyl radical, or an alkoxycarbonyl radical comprising from 1 to 12 carbon atoms; and $R^{14}$ and $R^{15}$ represent, independently of one another, a hydrogen, a linear or branched alkyl radical, a cycloalkyl radical or an arylalkyl radical;
    - or $R^{14}$ and $R^{15}$ together form an aliphatic ring comprising from 4 to 12 carbon atoms, said ring being optionally substituted and optionally comprising one or more heteroatoms; or
    - a —CH($R^9$)—O—C(O)—$NHR^{16}$ radical wherein $R^9$ represents a hydrogen, a linear or branched alkyl radical, a cycloalkyl radical, an arylalkyl radical, or an alkoxycarbonyl radical comprising from 1 to 12 carbon atoms; and $R^{16}$ represents a hydrogen or a linear or branched alkyl radical comprising from 1 to 30 carbon atoms; or
    - a —C(=O)—13 $R^{17}$ radical with $R^{17}$ representing a linear or branched alkyl radical or a (hetero)aryl radical, or an arylalkyl radical; or
    - a —C(=O)—N($R^{18}$)($R^{19}$) radical with $R^{18}$ and $R^{19}$ each representing, independently of one another, a hydrogen, a linear or branched alkyl radical, a cycloalkyl radical, or an arylalkyl radical or $R^{18}$ and $R^{19}$ together form an aliphatic ring comprising from 4 to 12 carbon atoms, said ring being optionally substituted and optionally comprising one or more heteroatoms.

Preferably, the compounds of formula (IV-B) are those for which $G^2$ represents a (hetero)aryl radical comprising from 5 to 12 carbon atoms, preferably substituted by at least two alkyl groups or by at least one —$CH_2OH$ group or by at least one —OH group.

The compounds of formula (IV-A) preferably have one of the following formulae (IV-A-1), (IV-A-2), (IV-A-3), (IV-A-4) or (IV-A-5):

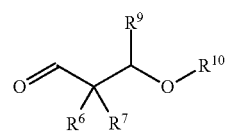
(IV-A-1)

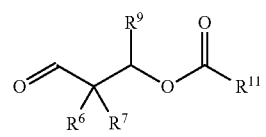
(IV-A-2)

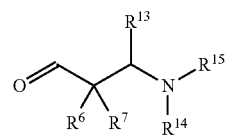
(IV-A-3)

-continued

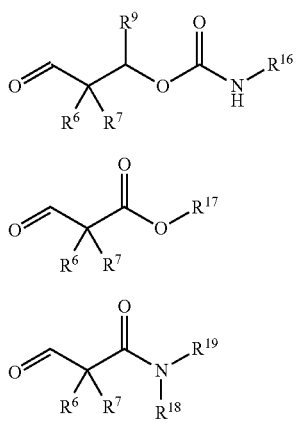

(IV-A-4)

(IV-A-5)

(IV-A-6)

wherein:
$R^6$ and $R^7$ each represent, independently of one another, a monovalent hydrocarbon radical comprising from 1 to 12 carbon atoms, said radical being optionally substituted by an —OH group;
or $R^6$ and $R^7$ together form an aliphatic ring comprising from 4 to 12 carbon atoms, said ring being optionally substituted;
$R^9$ represents a hydrogen, a linear or branched alkyl radical, an arylalkyl radical or an alkoxycarbonyl radical comprising from 1 to 12 carbon atoms;
$R^{10}$ represents a hydrogen or a hydrocarbon radical comprising from 1 to 30 carbon atoms, said radical optionally comprising one or more oxygen atoms;
$R^{11}$ represents hydrogen, or a linear or branched alkyl radical comprising from 1 to 30 carbon atoms, said alkyl radical optionally comprising cyclic portions and optionally at least one heteroatom;
$R^{13}$ represents a hydrogen, a linear or branched alkyl radical, an arylalkyl radical or an alkoxycarbonyl radical comprising from 1 to 12 carbon atoms;
$R^{14}$ and $R^{15}$ each represent, independently of one another, a hydrogen, a linear or branched alkyl radical, a cycloalkyl radical, or an arylalkyl radical;
or $R^{14}$ and $R^{15}$ together form an aliphatic ring comprising from 4 to 12 carbon atoms, said ring being optionally substituted and optionally comprising one or more heteroatoms;
$R^{16}$ represents a hydrogen or a linear or branched alkyl radical comprising from 1 to 30 carbon atoms;
$R^{17}$ representing a linear or branched alkyl radical or a (hetero)aryl radical, or an arylalkyl radical;
$R^{18}$ and $R^{19}$ each representing, independently of one another, a hydrogen, a linear or branched alkyl radical, a cycloalkyl radical, or an arylalkyl radical or $R^{18}$ and $R^{19}$ together form an aliphatic ring comprising from 4 to 12 carbon atoms, said ring being optionally substituted and optionally comprising one or more heteroatoms.

Among the aldehydes of formula (IV-A), mention may for example be made of pivalaldehyde (=2,2-dimethylpropanal), 2,2-dimethylbutanal, 2,2-diethylbutanal, 1-methylcyclopentanecarboxaldehyde, 1-methylcyclohexanecarboxaldehyde; ethers derived from 2-hydroxy-2-methylpropanal and alcohols such as propanol, isopropanol, butanol and 2-ethylhexanol; esters derived from 2-formyl-2-methylpropionic acid or 3-formyl-3-methylbutyric acid and alcohols such as propanol, isopropanol, butanol and 2-ethylhexanol; esters derived from 2-hydroxy-2-methylpropanal and carboxylic acids such as butyric acid, isobutyric acid, and 2-ethylhexanoic acid; and also ethers and esters derived from 3-hydroxypropanal that is 2,2-disubstituted, hydroxybutanals or higher homologous aldehydes, such as for example 2,2-dimethyl-3-hydroxypropanal as described below.

The aldehydes of formula (IV-A-1) represent in particular aliphatic, cycloaliphatic or arylaliphatic ethers obtained from 3-hydroxyaldehydes that are 2,2-disubstituted and alcohols, such as for example with fatty alcohols, or phenols of formula $R^{10}$—OH.

The 2,2-disubstituted 3-hydroxyaldehydes may be obtained via a cross reaction between primary or secondary aliphatic aldehydes, such as for example formaldehyde, and secondary aliphatic, cycloaliphatic or arylaliphatic aldehydes, such as for example isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde. Among the examples of 2,2-disubstituted 3-hydroxyaldehydes, mention may be made of 2,2-dimethyl-3-hydroxypropanal, 2-(hydroxymethyl)-2-methylbutanal, 2-(hydroxymethyl)-2-ethylbutanal, 2-(hydroxymethyl)-2-methylpentanal, 2-(hydroxymethyl)-2-ethylhexanal, 1-(hydroxymethyl)cyclopentanecarboxaldehyde, 1-(hydroxymethyl)cyclohexanecarboxaldehyde, 1-(hydroxymethyl)cyclohex-3-enecarboxaldehyde, 2-(hydroxymethyl)-2-methyl-3-phenylpropanal, 3-hydroxy-2-methyl-2-phenylpropanal and 3-hydroxy-2,2-diphenylpropanal.

Particularly preferred aldehydes of formula (IV-A-1) are 2,2-dimethyl-3-phenoxypropanal, 3-cyclohexyloxy-2,2-dimethylpropanal, 2,2-dimethyl-3-(2-ethylhexyloxy)propanal, 2,2-dimethyl-3-lauroxypropanal, 2,2-dimethyl-3-stearoxypropanal, 3-hydroxy-2,2-dimethylpropanal and 3-hydroxy-2-(hydroxymethyl)-2-methylpropionaldehyde.

According to one embodiment, the compounds of formula (IV-A-1) are those for which: —$R^6$ and $R^7$ each represent, independently of one another, a linear or branched alkyl radical comprising from 1 to 12 carbon atoms, said radical being optionally substituted by an -OH group;
$R^9$ represents a hydrogen;
$R^{1o}$ represents a hydrogen.

The aldehydes of formula (IV-A-2) represent in particular esters of 2,2-disubstituted 3-hydroxyaldehydes, such as for example 2,2-dimethyl-3-hydroxypropanal, 2-hydroxymethyl-2-methylbutanal , 2-hydroxymethyl-2-ethylbutanal, 2-hydroxymethyl-2-methylpentanal, 2-hydroxymethyl-2-ethylhexanal, 1-hydroxymethylcyclopentanecarboxaldehyde, 1-hydroxymethylcyclohexanecarboxaldehyde, 1-hydroxymethylcyclohex-3 -enecarboxaldehyde, 2-hydroxymethyl-2-methyl-3-phenylpropanal, 3-hydroxy-2-methyl-2-phenylpropanal and 3-hydroxy-2,2-diphenylpropanal, with carboxylic acids.

The carboxylic acids that can be used for this reaction are, for example, saturated aliphatic carboxylic acids such as formic acid, acetic acid, propionic acid, butyric acid, isobutyric acid, valeric acid, caproic acid, 2-ethylcaproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid and arachidic acid; unsaturated aliphatic carboxylic acids such as palmitoleic acid, oleic acid and erucic acid; polyunsaturated aliphatic carboxylic acids such as linoleic acid, linolenic acid, eleostearic acid and arachidonic acid; cycloaliphatic carboxylic acids such as cyclohexanecarboxylic acids; arylaliphatic acids such as phenylacetic acid; aromatic carboxylic acids such as benzoic acid, naphthoic acid, toluic acid and anisic acid; isomers of these acids; mixtures of fatty acids resulting from the saponification of natural fats and oils such as rapeseed oil, sunflower oil, linseed oil, olive oil, coconut oil, palm kernel oil, and palm oil; and also dicarboxylic acid monoalkyl and monoaryl esters, obtained by simple esterification of dicarboxylic acids acids such as succinic acid, glutaric acid, adipic adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and similar derivatives based on polyethylene glycol, with alcohols such as methanol, ethanol, propanol, butanol, higher homologs and isomers of these alcohols.

Among the aldehydes of formula (IV-A-2), mention may for example be made of 2,2-dimethyloxopropyl acetate, or 2,2-dimethyl-3-oxopropyl dodecanoate.

According to one embodiment, the compounds of formula (IV-A-2) are those for which:

$R^6$ and $R^7$ each represent, independently of one another, a linear or branched alkyl radical comprising from 1 to 12 carbon atoms, said radical being optionally substituted by an —OH group;

$R^9$ represents a hydrogen;

$R^{11}$ represents a hydrogen or a linear or branched alkyl radical comprising from 1 to 30 carbon atoms, preferentially from 1 to 11 carbon atoms.

According to one embodiment, the compounds of formula (IV-A-3) are those for which:

$R^6$ and $R^7$ each represent, independently of one another, a linear or branched alkyl radical comprising from 1 to 12 carbon atoms;

$R^{13}$ represents a hydrogen;

$R^{14}$ and $R^{15}$ together form an aliphatic ring comprising from 4 to 12 carbon atoms, said ring comprising a heteroatom.

Among the aldehydes of formula (IV-A-3), mention may for example be made of 2,2-dimethyl-3-(morpholin-4-yl) propanal (CAS number: 23588-51-4).

Among the aldehydes of formula (IV-A-5), mention may for example be made of the following compounds:

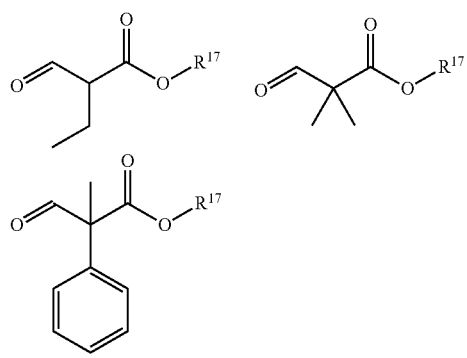

with $R^{17}$ being as defined above.

Among the aldehydes of formula (IV-B), mention may for example be made of the aldehydes of the following formulae (IV-B-1), (IV-B-2), (IV-B-3), (IV-B-4), (IV-B-5), (IV-B-6), (IV-B-7) or (IV-B-8):

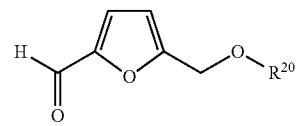
(IV-B-1)

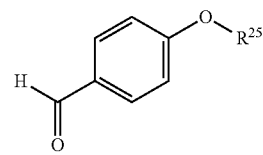
(IV-B-2)

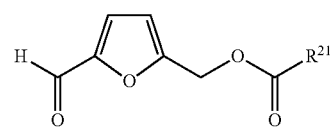
(IV-B-3)

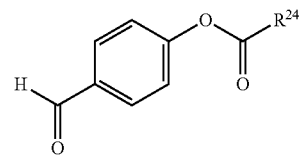
(IV-B-4)

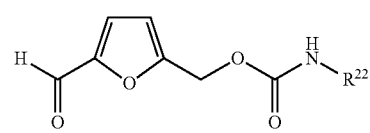
(IV-B-5)

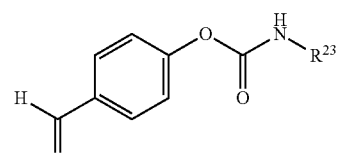
(IV-B-6)

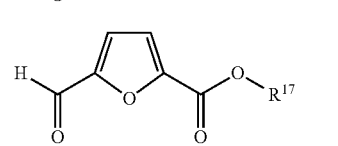
(IV-B-7)

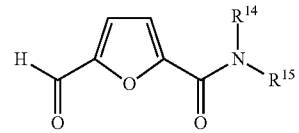
(IV-B-8)

wherein $R^{17}$, $R^{14}$, $R^{15}$, $R^{25}$, $R^{20}$, $R^{21}$, $R^{22}$, $R^{23}$ and $R^{24}$ are as defined above.

Among the aldehydes of formula (IV-B), mention may for example be made of 2- and 3- and 4-formylpyridine, 2-furfuraldehyde, 2-thiophenecarbaldehyde, quinoline-2-carbaldehyde and the 3-, 4-, 5-, 6-, 7- and 8- position isomers thereof; and also glyoxal, glyoxylic acid-esters such as glyoxylic acid methyl ester, cinnamaldehyde, and substituted cinnamaldehydes; and dimethylcyclohex-3-ene-1-carbaldehyde.

According to one embodiment, the aldehydes of formula (III) are chosen from the group consisting of 2,2-dimethyl-3-phenoxypropanal, 2,2-dimethyl-3-cyclohexyloxypropanal, 2,2-dimethyl-3-(2-ethylhexyloxy)propanal, 2,2-dimethyl-3-lauryloxypropanal, 2,2-dimethyl-3-stearyloxypropanal, 2,2-dimethyl-3-(morpholin-4-yl)propanal, 2,2-dimethyl-3-oxopropyl acetate, 2,2-dimethyl-3-oxopropyl dodecanoate, 2,2-dimethyl-3-(m-phenyl)propanal, 2,2-dimethyl-3-(m-tolyl)propanal or majantal, dimethylcyclohex-3-ene-1-carbaldehyde, 3-hydroxy-2-(hydroxymethyl)-2-methylpropionaldehyde, and mixtures thereof.

Preferably, use is made of a monoamine c) or monoaldehyde c) when the —CHO/—NH$_2$ molar ratio in the polyimine A preparation process is other then 1.

According to one embodiment, when the —CHO/—NH$_2$ molar ratio is strictly greater than 1, a monoamine c) is used.

According to one embodiment, when the —CHO/—NH$_2$ molar ratio is strictly less than 1, a monoaldehyde c) is used.

Dihydroxyaldimine i)

The dihydroxyaldimines can be obtained by reaction between:
- at least one hydroxyaldehyde comprising just one hydroxyl function; and
- at least one primary diamine.

The hydroxyaldehyde comprising just one hydroxyl function may for chosen for example from the group consisting of 5-(hydroxymethyl)furfural (CAS number: 67-47-0), 4-hydroxybenzaldehyde (CAS number: 123-08-0), 7-hydroxy-3,7-dimethyloctanal (CAS number: 107-75-5), 9-hydroxy-5,9-dimethyldec-4-enal (CAS number: 926-50-1) and 2,2-substituted 3-hydroxyaldehydes such as 2,2-dimethyl-3-hydroxypropanal (CAS number: 597-31-9), 2-(hydroxymethyl)-2-methylbutanal, 2-(hydroxymethyl)-2-ethylbutanal, 2-(hydroxymethyl)-2-methylpentanal, 2-(hydroxymethyl)-2-ethylhexanal, 1-(hydroxymethyl)cyclopentanecarboxaldehyde, 1-(hydroxymethyl)cyclohexanecarboxaldehyde, 1-(hydroxymethyl)cyclohex-3-enecarboxaldehyde, 2-(hydroxymethyl)-2-methyl-3-phenylpropanal, 3-hydroxy-2-methyl-2-phenylpropanal, 3-hydroxy-2,2-diphenylpropanal and mixtures thereof.

The 2,2-disubstituted 3-hydroxyaldehydes may be obtained via a cross reaction between primary or secondary aliphatic aldehydes, such as for example formaldehyde, and secondary aliphatic, cycloaliphatic or arylaliphatic aldehydes, such as for example isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde.

According to one embodiment, the hydroxyaldehydes are chosen from the group consisting of 3-hydroxy-2,2-dimethylpropanal (CAS number: 597-31-9), 5-(hydroxymethyl)furfural (CAS number: 67-47-0), 4-hydroxybenzaldehyde (CAS number: 123-08-0), 7-hydroxy-3,7-dimethyloctanal (CAS number: 107-75-5), 9-hydroxy-5,9-dimethyldec-4-enal (CAS number: 926-50-1), and mixtures thereof.

The primary diamine is as described above for the primary diamine b).

Polyisocyanate D

The polyisocyanate D is chosen from isocyanates and polyurethanes comprising at least two NCO end functions.

The description of the polyisocyanate C mentioned above, and also the preferred embodiments and modes apply to the polyisocyanate D.

Monohydroxyaldimine iii)

The monohydroxyaldimine can be obtained by reaction between:
- at least one aldehyde comprising just one hydroxyl function; and
- at least one primary monoamine.

The hydroxyaldehyde comprising just one hydroxyl function may for chosen for example from the group consisting of 5-(hydroxymethyl)furfural (CAS number: 67-47-0), 4-hydroxybenzaldehyde (CAS number: 123-08-0), 7-hydroxy-3,7-dimethyloctanal (CAS number: 107-75-5), 9-hydroxy-5,9-dimethyldec-4-enal (CAS number: 926-50-1) and 2,2-substituted 3-hydroxyaldehydes such as 2,2-dimethyl-3-hydroxypropanal, 2-(hydroxymethyl)-2-methylbutanal, 2-(hydroxymethyl)-2-ethylbutanal, 2-(hydroxymethyl)-2-methylpentanal, 2-(hydroxymethyl)-2-ethylhexanal, 1-(hydroxymethyl)cyclopentanecarboxaldehyde, 1-(hydroxymethyl)cyclohexanecarboxaldehyde, 1-(hydroxymethyl)cyclohex-3-enecarboxaldehyde, 2-(hydroxymethyl)-2-methyl-3-phenylpropanal, 3-hydroxy-2-methyl-2-phenylpropanal, 3-hydroxy-2,2-diphenylpropanal and mixtures thereof.

The 2,2-disubstituted 3-hydroxyaldehydes may be obtained via a cross reaction between primary or secondary aliphatic aldehydes, such as for example formaldehyde, and secondary aliphatic, cycloaliphatic or arylaliphatic aldehydes, such as for example isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde.

According to one embodiment, the hydroxyaldehydes are chosen from the group consisting of 3-hydroxy-2,2-dimethylpropanal (CAS number: 597-31-9), 5-(hydroxymethyl)furfural (CAS number: 67-47-0), 4-hydroxybenzaldehyde (CAS number: 123-08-0), 7-hydroxy-3,7-dimethyloctanal (CAS number: 107-75-5), 9-hydroxy-5,9-dimethyldec-4-enal (CAS number: 926-50-1), and mixtures thereof.

The primary monoamine is as described above for the monoamines c).

Monoisocyanate iii)

The monoisocyanate iii) can be chosen for example from the group consisting of p-tolyl isocyanate, p-isopropylphenyl isocyanate, p-toluenesulfonyl isocyanate (CAS number: 4083-64-1), 3-isocyanatopropyltrimethoxysilane, 3-isocyanatopropyltriethoxysilane, 3-isocyanatopropylmethyldimethoxysilane, 3-isocyanatopropylmethyldiethoxysilane, and linear or branched, saturated or unsaturated, aliphatic monoisocyanates such as 1-isocyanatododecane, 1-isocyanatotetradecane, 1-isocyanatohexadecane and 1-isocyanatooctadecane.

Sealant Composition

In the composition, the —C=N— aldimine function/—NCO function molar ratio may range from 0.50 to 2.0, preferably 0.50 to 1.5 and preferentially from 0.7 to 1.2.

According to one embodiment, the composition further comprises at least one additive chosen from plasticizers, solvents, pigments, adhesion promoters, moisture absorbers, UV stabilizers (or antioxidants), molecular sieves, glitter, fluorescent materials, rheological additives, fillers, and mixtures thereof.

The filler can be chosen from organic fillers, inorganic fillers and mixtures thereof.

Use may be made, as organic filler(s), of any organic filler and in particular polymeric filler typically used in the field of sealant compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may notably be made of hollow microspheres made of vinylidene chloride/acrylonitrile.

The mean particle size of the filler(s) which can be used is preferably less than or equal to 10 microns, more preferentially less than or equal to 3 microns, in order to prevent them from settling in the composition according to the invention during its storage.

The mean particle size is measured for a volume particle size distribution corresponding to 50% by volume of the sample of particles which is analyzed. When the particles are spherical, the mean particle size corresponds to the median diameter (D50 or Dv50), which corresponds to the diameter such that 50% of the particles by volume have a size which is smaller than said diameter. In the present application, this value is expressed in micrometres and determined according to the standard NF ISO 13320-1 (1999) by laser diffraction on an appliance of Malvern type.

Use may be made, as examples of inorganic filler(s), of any inorganic filler typically used in the field of surface coating, adhesive or sealant compositions. The inorganic fillers can be provided in the form of particles of diverse geometry. They can, for example, be spherical or fibrous or exhibit an irregular shape.

According to one embodiment, the filler is chosen from sand, glass beads, glass, quartz, barite, alumina, mica, talc, carbonate fillers and mixtures thereof.

The sand which can be used in the present invention preferably has a particle size ranging from 0.1 to 400 μm, preferentially from 1 to 400 μm, more preferably from 10 to 350 μm, more preferably from 50 to 300 μm.

The glass beads which can be used in the present invention preferably have a particle size ranging from 0.1 to 400 μm, preferentially from 1 to 400 μm, more preferably from 10 to 350 μm, more preferably from 50 to 300 μm.

Preferably, the filler is a carbonate filler chosen from alkali metal or alkaline earth metal carbonates, such as, for example, calcium carbonate.

These fillers can be natural or treated, for example using an organic acid, such as stearic acid, or a mixture of organic acids consisting predominantly of stearic acid.

The total amount of filler can vary from 0.01% to 70% by weight, preferably from 20% to 65%, preferentially from 20% to 50%, advantageously from 25% to 40%, by weight, with respect to the total weight of the composition.

The composition can comprise at least one plasticizing agent in a proportion of 5% to 30% by weight, preferably of 10% to 30% by weight, preferentially of 15% to 25% by weight, relative to the total weight of said composition.

Mention may be made, as examples of plasticizing agent which can be used, of any plasticizing agent generally used in the field of adhesives, sealants and/or surface coatings, such as, for example, phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes and mixtures thereof.

Mention may be made, among the phthalates, for example, of diisononyl phthalate, diisobutyl phthalate, dioctyl phthalate, dicyclohexyl phthalate, diisooctyl phthalate, diisododecyl phthalate, dibenzyl phthalate, diisodecyl phthalate (for example sold by BASF under the name Palatinol™ DIDP) or benzyl butyl phthalate.

Among the benzoates, examples that may be mentioned include: neopentyl glycol dibenzoate (available, for example, under the name Uniplex® 512 from Lanxess), dipropylene glycol dibenzoate (available, for example, under the name Benzoflex® 9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex® 2088 from Eastman).

Mention may be made, among the pentaerythritol esters, for example, of pentaerythritol tetravalerate (for example available, under the name Pevalen™, from Perstorp).

Among the cyclohexanedicarboxylates, an example that may be mentioned is diisononyl 1,2-cyclohexanedicarboxylate (available, for example, under the name Hexamoll Dinch® from BASF).

As examples of rheology agent(s) that may be used, mention may be made of any rheology agent customarily used in the field of adhesive, sealant and/or surface coating compositions.

Preferably, use is made of one or more rheological agents chosen from thixotropic agents, and more preferably from:
  PVC plastisols, corresponding to a suspension of PVC in a plasticizing agent which is miscible with PVC, obtained in situ by heating to temperatures ranging from 60° C. to 80° C. These plastisols can be those described in particular in the publication *Polyurethane Sealants,* Robert M. Evans, ISBN 087762-998-6,
  fumed silica,
  urea derivatives resulting from the reaction of an aromatic diisocyanate monomer, such as 4,4'-MDI, with an aliphatic amine, such as butylamine, for instance Gelpaste Urea (EC: 416-600-4). The preparation of such urea derivatives is described in particular in the application FR 1 591 172.

The total content of rheological agent(s) which can be used can vary from 1% to 40% by weight, preferably from 5% to 30% by weight, more preferentially from 10% to 25% by weight, with respect to the total weight of the composition.

The solvent is preferably a solvent which is volatile at a temperature of 23° C. The volatile solvent can, for example, be chosen from alcohols which are volatile at 23° C., such as ethanol or isopropanol. The volatile solvent makes it possible, for example, to reduce the viscosity of the composition and make the composition easier to apply. The volatile character of the solvent makes it possible in particular for the joint, obtained after curing the composition, to no longer contain solvent. Thus, the solvent has, for example, no negative influence on the hardness of the seal.

When a solvent, in particular a volatile solvent, is present in the composition, its content is preferably less than or equal to 5% by weight, more preferably less than or equal to 3% by weight, relative to the total weight of the composition.

Preferably, the content of solvent(s) in the composition is between 0% and 5% by weight.

The pigments can be organic or inorganic pigments.

For example, the pigment is $TiO_2$, in particular Kronos® 2059 sold by Kronos.

The composition may comprise an amount of from 0.1% to 3%, preferably from 0.1% to 3%, more preferentially still from 0.1% to 1% by weight, of at least one UV stabilizer or antioxidant. These compounds are typically introduced in order to protect the composition from degradation resulting from a reaction with oxygen which is liable to be formed by the action of heat or light. These compounds may include primary antioxidants which trap free radicals. The primary antioxidants may be used alone or in combination with other secondary antioxidants or UV stabilizers.

Mention may be made, for example, of Irganox® 1010, Irganox® B561, Irganox® 245, Irgafos® 168, Tinuvin® 328 or Tinuvin™ 770, which are sold by BASF.

B. Polyimine A

The present invention also relates to a polyimine A obtained via a process comprising a step of reaction between at least:
- a) a (poly)urethane-aldehyde comprising at least 2 aldehyde functions;
- b) a primary diamine;
- c) optionally in the presence of a primary monoamine or a monoaldehyde if the —CHO/NH$_2$ molar ratio is other than 1;

characterized in that said (poly)urethane-aldehyde a) is a (poly)urethane-dialdehyde comprising an allophanate radical.

The (poly)urethane-aldehyde, primary diamines, primary monoamine and monoaldehyde are in particular as described and defined above for the sealant composition, said (poly)urethane-aldehyde a) however being characterized in that it is a (poly)urethane-dialdehyde c omprising an allophanate radical. In particular, all the preferred embodiments and modes described above for these compounds apply here for the polyimine A.

According to one embodiment, the (poly)urethane-dialdehyde is obtained by reaction between:
- at least one polyisocyanate C comprising at least one allophanate radical; and
- at least one hydroxyaldehyde.

Preferably, the (poly)urethane-dialdehyde is obtained by reaction between:
- at least one polyisocyanate C comprising at least one allophanate radical; and
- at least one hydroxyaldehyde;

in amounts such that the NCO/OH molar ratio (r2) ranges from 0.95 to 1.05, preferably is equal to 1.

According to a preferred embodiment, the polyisocyanate C is the HDI allophanate having in particular the following formula (Y1):

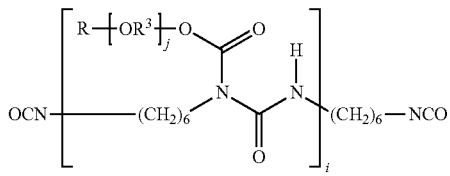

According to another preferred embodiment, the polyisocyanate C is a polyurethane comprising at least two NCO end functions which is prepared by a process comprising a polyaddition reaction E1):
- i) of at least one polyisocyanate;
- ii) with at least one polyol, in amounts such that the NCO/OH molar ratio (r1) is strictly greater than 1; step E1) preferably using at least one HDI allophanate, preferably having the following formula (Y1):

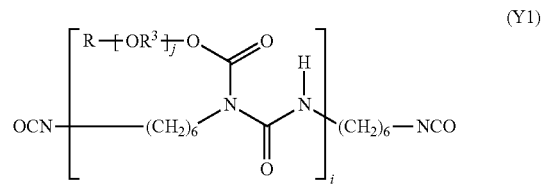

Preferably, the (poly)urethane-aldehyde a) has one of the following formulae (I) or (II):

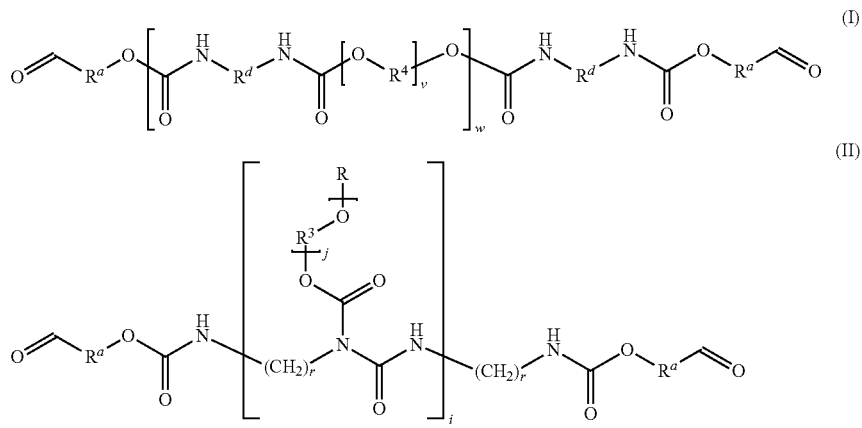

wherein:

$R^a$ is as defined above;

$R^d$ represents the following radical:

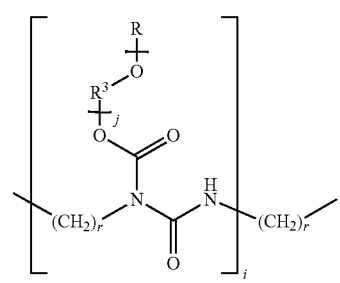

wherein i is an integer ranging from 1 to 2, j is an integer ranging from 0 to 9, and preferably 2 to 5, r is an integer ranging from 1 to 10, R represents a saturated or unsaturated, cyclic or acyclic, linear or branched, hydrocarbon chain comprising from 1 to 20 carbon atoms, preferably from 1 to 12 carbon atoms, or 6 to 14 carbon atoms, and $R^3$ represents a linear or branched divalent alkylene group having from 2 to 4 carbon atoms and preferably a divalent propylene group;

$R^4$ represents a divalent hydrocarbon radical derived from a polyol by replacement of each of the two hydroxyl groups with a free valency;

v is an integer such that the number-average molecular weight of the polyether block of formula —[$OR^4$]$_v$— ranges from 60 g/mol to 22 000 g/mol, preferably from 600 g/mol to 18 000 g/mol, preferably 1000 g/mol to 12 000 g/mol, preferably from 1000 to 8000 g/mol and more preferentially still from 1000 g/mol to 4000 g/mol;

w is an integer such that the number-average molecular weight (Mn) of the (poly)urethane-dialdehyde of formula (I) ranges from 500 g/mol to 22 000 g/mol, preferably from 500 g/mol to 18 000 g/mol, more preferably from 500 g/mol to 12 000 g/mol, and more preferentially still from 600 g/mol to 5000 g/mol.

Among the compounds of formula (II), mention may be made, for example, of the compounds of the following formulae:

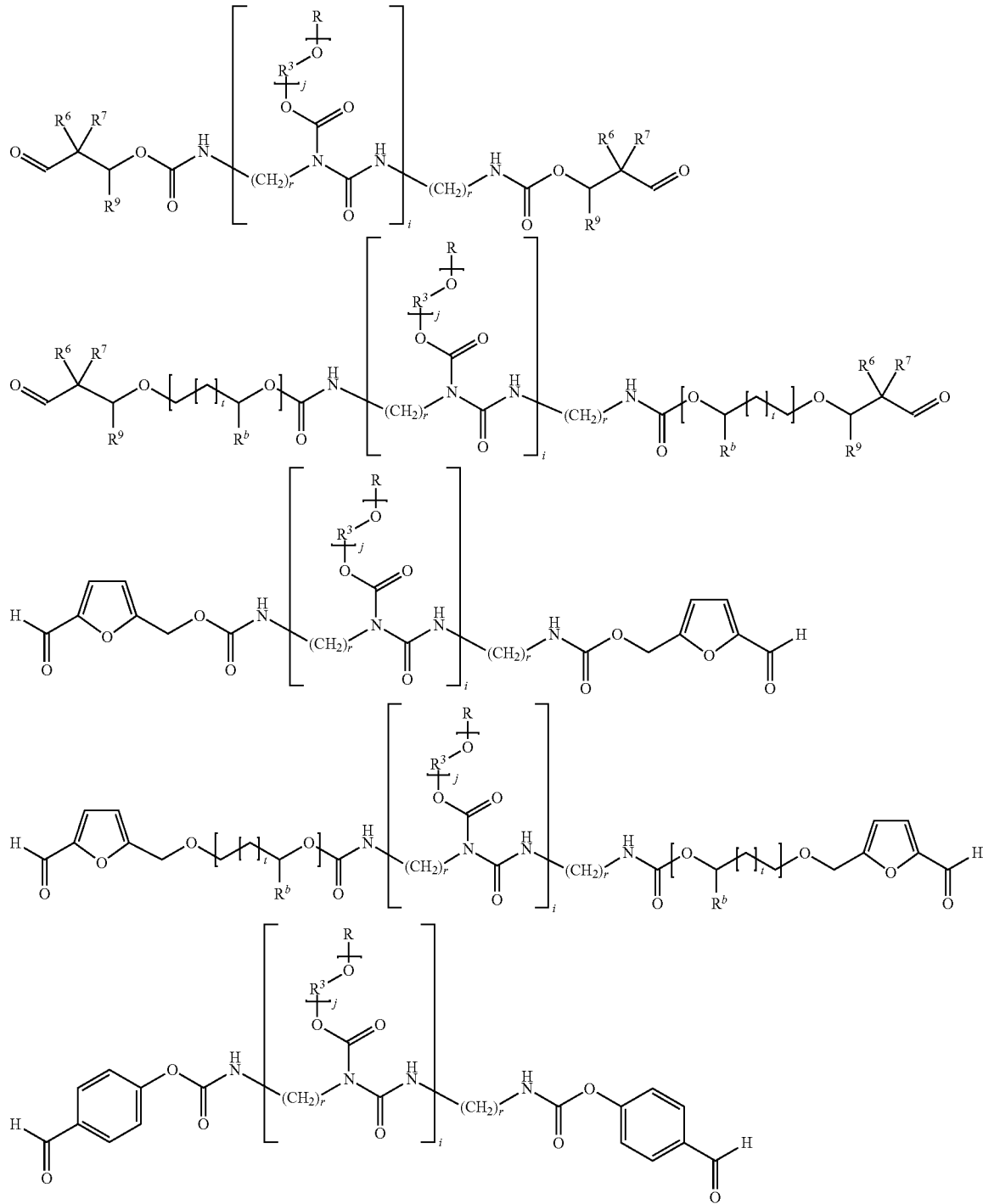

-continued

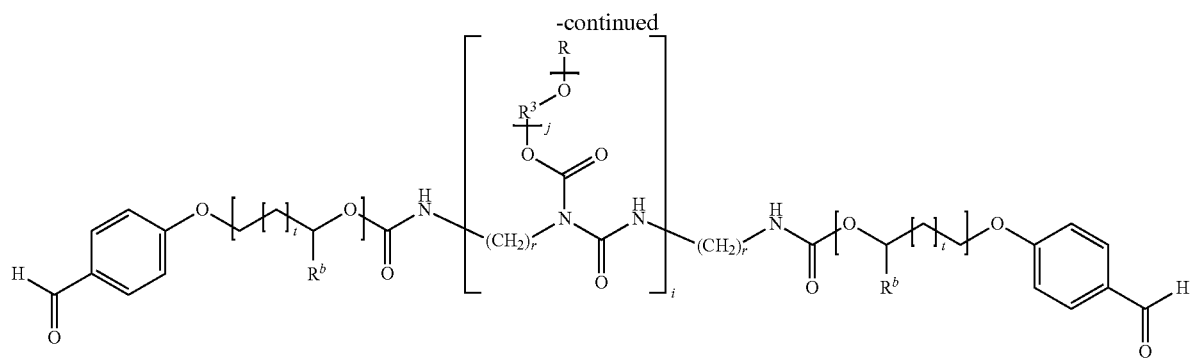

wherein R, $R^b$, $R^3$, r, t, u, i, j, $R^6$, $R^7$ and $R^9$ are as defined above.

In the context of the invention, the term "of between x and y" or "ranging from x to y" is understood to mean an interval in which the limits x and y are included. For example, the range "between 0% and 25%" includes in particular the values 0% and 25%.

The invention is now described in the following exemplary embodiments, which are given purely by way of illustration and should not be interpreted in order to limit the scope thereof.

EXAMPLES

The following ingredients were used:
Tolonate™ X FLO 100 available from Vencorex: allophanate of HDI and of fatty alcohol ethoxylate having a weight content of NCO groups of 12.3±1.0%;
2,2-dimethyl-3-hydroxypropanal or hydroxypivalaldehyde (CAS number: 597-31-9) available from Biosynth;
5-(hydroxymethyl)furfural (CAS number: 67-47-0) available from Purac Bioquimica;
Desmophen 4042 BT available from Covestro: PPG triol having a number-average molar mass in the vicinity of 3700 g/mol (OHN=43-46 mg KOH/g);
Voranol 2000 L available from Dow: PPG diol having a number-average molar mass in the vicinity of 2000 g/mol (OHN=53.5-57.5 mg KOH/g);
Voranol 1000 L available from Dow: PPG diol having a number-average molar mass in the vicinity of 1000 g/mol (OHN=106-114 mg KOH/g);
Voranol P 400 available from Dow: PPG diol having a number-average molecular weight in the vicinity of 430 g/mol (OHN=250-270 mg KOH/g);
Desmodur T 100 available from: 2,4'-TDI having a weight content of NCO groups 48.0% by weight;
DOTL available from TIB Chemicals: dioctyltin dilaurate;
xylene available from Sigma-Aldrich;
Jeffamine® D-400 available from Huntsman with a number average molecular weight (Mn) in the vicinity of 450 g/mol (primary alkalinity=4.1-4.7 meq/g).

Example 1—Synthesis of Urethane-Dialdehyde Based on NCO-Terminated Allophanate/2,2-dimethyl-3-hydroxypropanal U1

The following urethane-dialdehyde was synthesized according to the procedure described in U.S. Pat. No. 3,392,148 or JP 2015,064,998 by reacting 1 mol of Tolonate X-FLO 100 having an NCO weight content of 12.3% (polyisocyanate C) with 2 mol of 2,2-dimethyl-3-hydroxypropanal. The following urethane-dialdehyde U1 is obtained quantitatively, having a molar mass of 884 g/mol and 2.26 meq/g of aldehyde function.

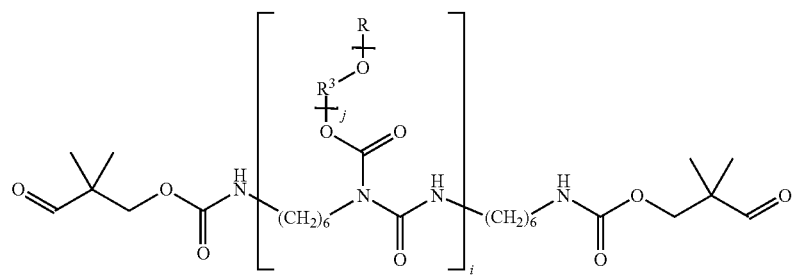

Example 2—Synthesis of Urethane-Dialdehyde Based on NCO-Terminated Allophanate/5-(hydroxymethyl)furfural U2

The following urethane-dialdehyde U2 was synthesized according to the procedure described in U.S. Pat. No. 3,392,148 or JP 2015,064,998 by reacting 1 mol of Tolonate X-FLO 100 having an NCO weight content of 12.3% (polyisocyanate C) with 2 mol of 5-(hydroxymethyl)furfural (NCO/OH molar ratio=1). The urethane-dialdehyde U2 is obtained quantitatively, having a molar mass of 933 g/mol and 2.14 meq/g of aldehyde function.

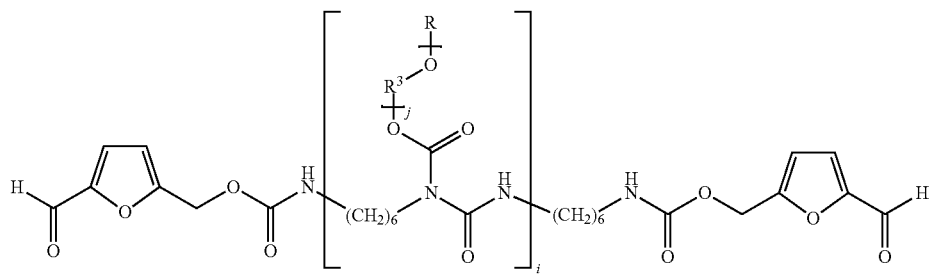

Example 3—Synthesis of Polyurethane-Dialdehyde Based on NCO-Terminated Polyurethane/5-(hydroxymethyl)furfural U3

The polyurethane-dialdehyde U3 was synthesized in 2 steps.

Step 1—Synthesis of the Terminated NCO-Terminated Polyurethane

An NCO-terminated polyurethane was prepared by mixing the ingredients indicated in the table below at a temperature below or equal to 95° C. under anhydrous conditions. The amounts indicated in the table below are expressed as percentages by weight relative to the total weight of the NCO-terminated polyurethane solution.

| Ingredients | |
|---|---|
| PPG diol having a number-average molar mass of 430 g/mol: Voranol P 400 | 25.1 |
| Allophanate of HDI and of fatty alcohol ethoxylate (% NCO = 12.3% by weight): Tolonate ™ X-FLO 100 | 59.7 |
| Catalyst (DOTL) | 0.012 |
| Toluene | 15.2 |
| NCO/OH molar ratio | 1.5 |
| Final % by weight of NCO | 3.0 |

In the above table, the final % by weight of NCO corresponds to the amount of NCO functions in the NCO-terminated polyurethane solution at the end of the polyurethane preparation reaction, expressed relative to the total weight of the NCO-terminated polyurethane solution.

Step 2—Synthesis of the Polyurethane-Dialdehyde

The polyurethane-dialdehyde U3 was synthesized quantitatively according to the procedure described in U.S. Pat. No. 3,392,148 by reacting 1 mol of the NCO-terminated polyurethane from step 1 with 2 mol of 5-(hydroxymethyl)furfural (NCO/OH molar ratio=1). The polyurethane-dialdehyde U3 is obtained quantitatively, having a molar mass of 3092 g/mol and 0.65 meq/g of aldehyde function.

Example 4—Synthesis of the Polyimines

In a reactor equipped with a stirrer and a Dean-Stark apparatus, 1 mol of (poly)urethane-dialdehyde (example 1, 2 or 3), 1 mmol of formic acid and then the primary diamine (e.g. Jeffamine® D-400 available from Huntsman) in an amount such that the —CHO/—NH$_2$ molar ratio >1 makes it possible to obtain a polyimine having a desired number-average molecular weight (Mn), are dissolved in 500 ml of toluene under an inert atmosphere (nitrogen). The mixture is heated and maintained at reflux for around 6 hours until no more water is removed by azeotropic distillation, and then the toluene is removed by distillation under reduced pressure (1 mmHg). The polyimines (11), (12) and (13) are obtained with a quantitative yield. Depending on the viscosity of the polyimines obtained, it is possible to dilute the polyimines in xylene to a solids content of 85%.

A —CHO/—NH$_2$ molar ratio of 1.1 was used for the synthesis of the polyimines. The characteristics of the polyimines obtained have been grouped together in the following table:

| | I1 | I2 | I3 |
|---|---|---|---|
| (poly)urethane-dialdehyde | Example 1 | Example 2 | Example 3 |
| Number-average molecular weight (Mn) in g/mol | 2773 | 2881 | 7630 |
| Content of C═N functions in meq/g | 1.44 | 1.39 | 0.52 |

Example 5: Application Test

Preparation of the NCO-Terminated Polyurethane P1

The non-limiting example of NCO-terminated polyurethane P used in the reference example outside the invention

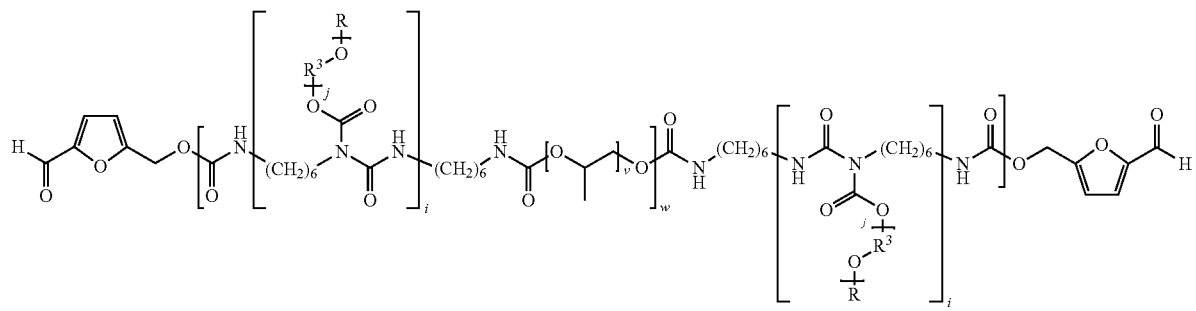

(without aldimine) and in examples C1 to C3 according to the invention (with aldimines according to the invention) was prepared by mixing the ingredients indicated in the following table at a temperature below or equal to 95° C. under anhydrous conditions. The amounts indicated in the table below are expressed as percentages by weight relative to the total weight of the polyurethane composition of each of the examples.

| Ingredients | P1 |
|---|---|
| PPG triol having a number-average molar mass of 3700 g/mol (OHN = 44.5 mg KOH/g): Desmophen 4042 BT | 38.3 |
| PPG diol having a number-average molar mass of 2000 g/mol: Voranol 2000 L | 36.9 |
| 2,4'-TDI (% NCO ≥ 48.0% by weight): Desdomur T 100 | 9.6 |
| Catalyst (DOTL) | 0.012 |
| Xylene | 15.2 |
| NCO/OH molar ratio | 1.6 |
| Final % by weight of NCO | 1.8 |

In the above table, the final % by weight of NCO corresponds to the amount of NCO functions in the polyurethane solution P1 at the end of the polyurethane preparation reaction, expressed relative to the total weight of the polyurethane solution.

Preparation of Sealant Compositions

Sealant compositions were then formulated from the NCO-terminated polyurethane P1 prepared in accordance with the above process.

The reference sealant composition outside the invention (without aldimine) and the sealant compositions C1 to C3 according to the invention (with polyimines according to the invention) have been reported in the following table:

| | Reference | C1 | C2 | C3 |
|---|---|---|---|---|
| Prepolymer (P1) | 19.40 | 17.31 | 17.11 | 17.11 |
| Mesamoll: CAS 91082-17-6 | 16.90 | 15.27 | 15.27 | 5.22 |
| Gel Paste CAS 77703-56-1 available from SIKA (dibutyl-4-4'-methylenedi(phenyl)urea) | 12.33 | 12.34 | 12.34 | 12.34 |
| DIDP: diisodecyl phthalate | 2.10 | — | — | — |
| PTSI: p-toluenesulfonyl isocyanate | 0.40 | 0.40 | 0.40 | 0.40 |
| IPDI | 0.40 | 0.40 | 0.40 | 0.40 |
| XDI | 0.20 | 0.20 | 0.20 | 0.20 |
| Silquest A-187 (MOMENTIVE) | 0.17 | 0.17 | 0.17 | 0.17 |
| Tinuvin B 75 (BASF) | 0.14 | 0.14 | 0.14 | 0.14 |
| Xylene | 1.90 | 1.90 | 1.90 | 1.90 |
| PVC (Solvin 373 MC) | 15.60 | 15.61 | 15.61 | 15.61 |
| OMYA BSH | 25.00 | 25.01 | 25.01 | 25.01 |
| TiO$_2$ | 4.90 | 4.90 | 4.90 | 4.90 |
| Aerosil R 202 | 0.51 | 0.51 | 0.51 | 0.51 |
| Polyimine I1 | | 5.74 | | |
| Polyimine I2 | | | 5.94 | |
| Polyimine I3 | | | | 15.89 |
| Salicylic acid | | 0.10 | 0.20 | 0.20 |
| Tin catalyst | 0.05 | — | — | — |

The above sealant compositions formulated from the NCO-terminated polyurethane (P1) and aldimines according to the invention compared to the reference sealant composition were characterized and the results reported in the table below:

| | Reference | C1 | C2 | C3 |
|---|---|---|---|---|
| Skinning time (min) | 7 h | 90 min | 90 min | 2 h |
| Extrusion (g/min) at t$^0$ | 250 | 300 | 300 | 200 |
| Boeing test | 0 | 0 | 0 | 0 |
| Elongation at break-Dumbbell (%) | 500 | 550 | 550 | 700 |
| 100% Modulus-Dumbbell (MPa) | 0.55 | 0.58 | 0.55 | 0.50 |
| Max. modulus (MPa) | 0.80 | 1.00 | 1.00 | 0.75 |
| 7-day stability | OK | OK | OK | OK |
| Extrusion at t$^0$ + 3 weeks at 40° C. (g/min) | 210 | 250 | 250 | 170 |
| Bubbling | Yes | No | No | No |

Characterization:
- the skinning time was measured according to the standard ISO 291 at 23° C. and 50% relative humidity,
- the extrusion corresponds to the amount, in grams, of sealant which was able to be extruded per minute, under a pressure of the piston of 3 bar at 23° C.
- the 100% modulus - dumbbell was measured according to the NF ISO 37 standard (March 2012) with dumbbell test specimens,
- the max. modulus was measured according to the ISO 8339 standard,
- the elongation at break—dumbbell was measured according to the NF ISO 37 standard (March 2012) with dumbbell test specimens,
- the creep resistance has been checked according to the ASTM D2202 standard known as the "Boeing Test".
- the extrusion of the sealant compositions is carried out through a 4-mm diameter extrusion nozzle under a pressure of 3 bar at 23° C. and constant humidity at the end of mixing) (t$^0$) and 3 weeks at 40° C. after the end of mixing (t$^0$+3 weeks) to assess their viscosity.

The invention claimed is:

1. A moisture-crosslinkable sealant composition comprising:
    at least one polyurethane P comprising at least two NCO end functions; and
    at least one polyimine A obtained via a process comprising a step of reaction between at least:
        a) a (poly) urethane-aldehyde comprising at least 2 aldehyde functions;
        b) a primary diamine;
        c) optionally in the presence of a primary monoamine or a monoaldehyde if a —CHO/NH$_2$ molar ratio is other than 1.

2. The composition as claimed in claim 1, wherein the (poly)urethane-aldehyde a) is obtained by reaction between:
    at least one polyisocyanate C; and
    at least one hydroxyaldehyde.

3. The composition as claimed in claim 2, wherein the at least one polyisocyanate C is selected from the group consisting of triisocyanates, diisocyanates and polyurethanes comprising at least two NCO end functions.

4. The composition as claimed in claim 1, wherein the (poly)urethane-aldehyde a) is a (poly)urethane-dialdehyde comprising an allophanate radical.

5. The composition as claimed in claim 2, wherein the at least one polyisocyanate C is a HDI allophanate having the following formula (Y1):

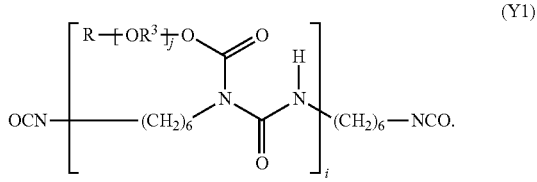

(Y1)

6. The composition as claimed in claim 2, wherein the at least one polyisocyanate C is a polyurethane comprising at least two NCO end functions which is prepared by a process comprising a polyaddition reaction E1):
   i. of at least one polyisocyanate;
   ii. with at least one polyol,
   in amounts such that a NCO/OH molar ratio (r1) is strictly greater than 1;
   step E1) using at least one HDI allophanate, having the following formula (Y1):

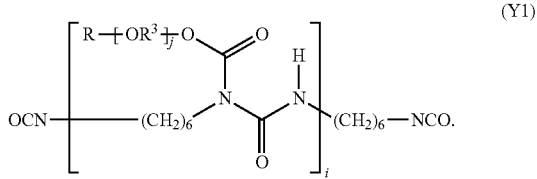

(Y1)

7. The composition as claimed in claim 2, wherein the at least one hydroxyaldehydes have one of the following formulae:

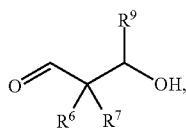

(A-1)

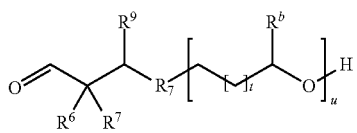

(A-2)

with $R^6$ and $R^7$ each representing, independently of one another, a monovalent hydrocarbon radical comprising from 1 to 12 carbon atoms, or $R^6$ and $R^7$ together form an aliphatic ring comprising from 4 to 12 carbon atoms, said ring being optionally substituted; $R^9$ representing a hydrogen, a linear or branched alkyl radical, a cycloalkyl radical, an arylalkyl radical, or an alkoxycarbonyl radical comprising from 1 to 12 carbon atoms; $R^b$ represents H or a linear or branched alkyl radical comprising from 1 to 7 carbon atoms; u represents an integer ranging from 1 to 380; and t represents an integer ranging from 0 to 18;

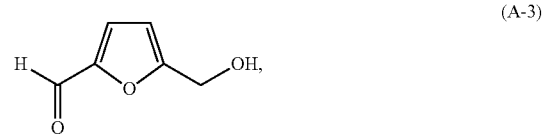

(A-3)

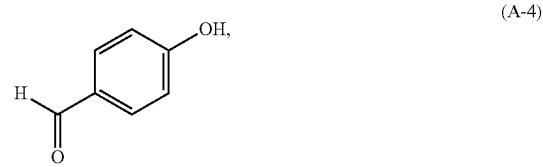

(A-4)

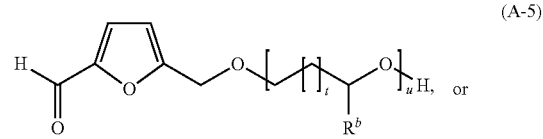

(A-5)

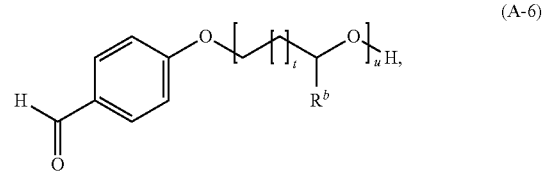

(A-6)

wherein:
   t is an integer ranging from 0 to 18;
   u represents an integer ranging from 1 to 380; and t represents an integer ranging from 0 to 18; and
   $R^b$ represents H or an alkyl radical ranging from 1 to 7 carbon atoms.

8. The composition as claimed in claim 1, wherein the (poly)urethane-aldehyde a) has one of the following formulae (I) or (II):

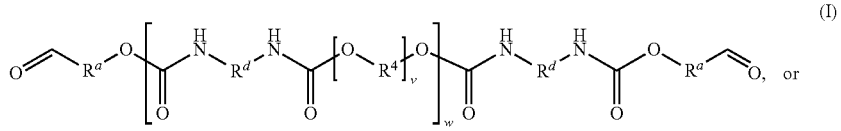

(I)

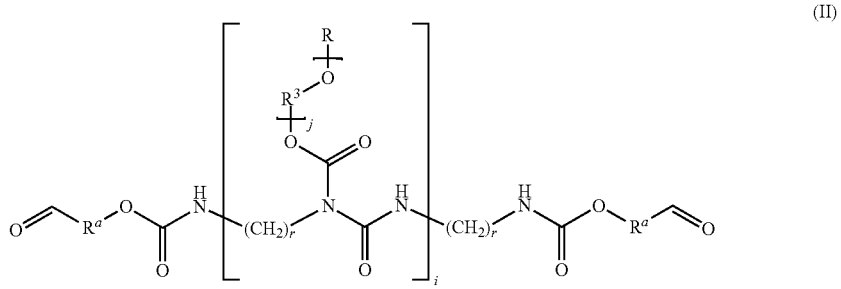

(II)

wherein:
R$^a$ is as defined above;
R$^d$ represents the following radical:

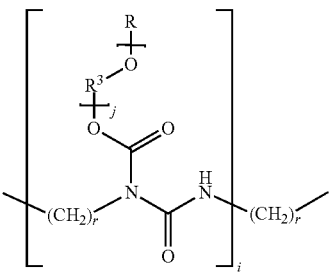

wherein i is an integer ranging from 1 to 2, j is an integer ranging from 0 to 9, r is an integer ranging from 1 to 10, R represents a saturated or unsaturated, cyclic or acyclic, linear or branched, hydrocarbon chain comprising from 1 to 20 carbon atoms, and R$^3$ represents a linear or branched divalent alkylene group having from 2 to 4 carbon atoms;

R$^4$ represents a divalent hydrocarbon radical derived from a polyol by replacement of each of the two hydroxyl groups with a free valency;

v is an integer such that the number-average molecular weight of the polyether block of formula -[OR$^{41}$]$_v$- ranges from 60 g/mol to 22 000 g/mol;

w is an integer such that the number-average molecular weight (Mn) of the (poly)urethane-dialdehyde of formula (I) ranges from 500 g/mol to 22 000 g/mol.

9. The composition as claimed in claim 1, wherein the primary diamine is selected from the group consisting of linear or branched aliphatic amines; aliphatic polyamines; polyetheramines; polyamidoamines; dimer fatty amines; derivatives of diamino acids; amines of the following formula (B): H$_2$N—CH$_2$—Z—CH$_2$—NH$_2$ wherein Z represents a linear or branched, cyclic, aliphatic or aromatic, saturated or unsaturated divalent hydrocarbon radical, said hydrocarbon radical being optionally interrupted by one or more heteroatoms chosen from —S—, —O— and/or one or more tertiary amine divalent groups —NR— with R representing a linear or branched, saturated or unsaturated alkyl group, comprising 1 to 22 carbon atoms; and mixtures thereof.

10. The composition as claimed in claim 1, wherein a —C=N-aldimine function/-NCO function molar ratio may range from 0.50 to 2.0.

11. The composition as claimed in claim 1, wherein it further comprises at least one additive selected from the group consisting of plasticizers, solvents, pigments, adhesion promoters, moisture absorbers, UV stabilizers (or antioxidants), molecular sieves, glitter, fluorescent materials, rheological additives, fillers, and mixtures thereof.

12. A polyimine A obtained via a process comprising a step of reaction between at least:
   a) a (poly)urethane-aldehyde comprising at least 2 aldehyde functions;
   b) a primary diamine;
   c) optionally in the presence of a primary monoamine or a monoaldehyde if a —CHO/NH$_2$ molar ratio is other than 1;
wherein said (poly)urethane-aldehyde a) is a (poly)urethane-dialdehyde comprising an allophanate radical.

13. The polyimine A as claimed in claim 12, wherein the (poly)urethane-dialdehyde is obtained by reaction between:
   at least one polyisocyanate C comprising at least one allophanate radical; and
   at least one hydroxyaldehyde.

14. The polyimine A as claimed in claim 13, wherein the (poly)urethane-dialdehyde is obtained by reaction between:
   at least one polyisocyanate C comprising at least one allophanate radical; and
   at least one hydroxyaldehyde;
in amounts such that a NCO/OH molar ratio (r2) ranges from 0.95 to 1.05.

15. The polyimine as claimed in claim 13, wherein the at least one polyisocyanate C is the HDI allophanate having the following formula (Y1):

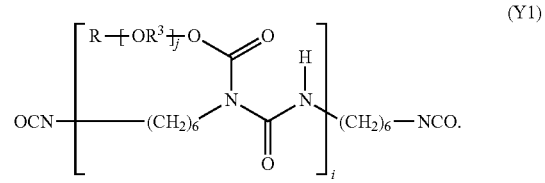

16. The polyimine as claimed in claim 13, wherein the at least one polyisocyanate C is a polyurethane comprising at least two NCO end functions which is prepared by a process comprising a polyaddition reaction E1):
   i. of at least one polyisocyanate;
   ii. with at least one polyol,
   in amounts such that a NCO/OH molar ratio (r1) is strictly greater than 1;
step E1) using at least one HDI allophanate, having the following formula (Y1):

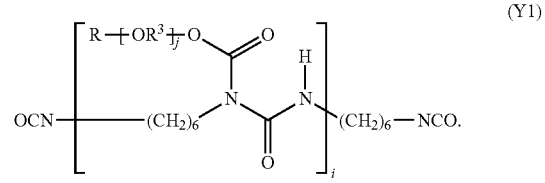

17. The polyimine A as claimed in claim 12, wherein the (poly)urethane-aldehyde a) has one of the following formulae (I) or (II):

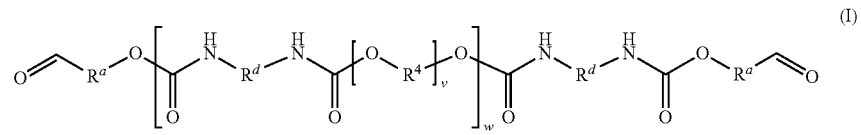

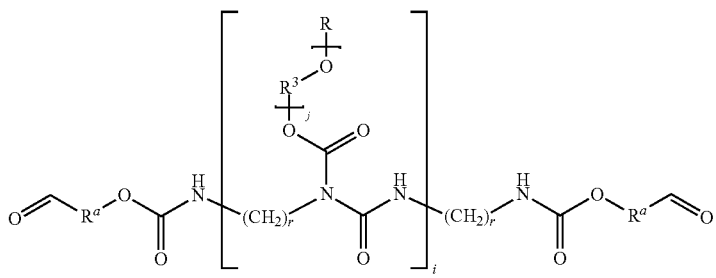

(II)

wherein:
R$^a$ is as defined above;
R$^d$ represents the following radical:

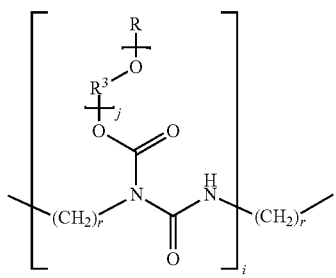

wherein i is an integer ranging from 1 to 2, j is an integer ranging from 0 to 9, r is an integer ranging from 1 to 10, R represents a saturated or unsaturated, cyclic or acyclic, linear or branched, hydrocarbon chain comprising from 1 to 20 carbon atoms, and R$^3$ represents a linear or branched divalent alkylene group having from 2 to 4 carbon atoms;

R$^4$ represents a divalent hydrocarbon radical derived from a polyol by replacement of each of the two hydroxyl groups with a free valency;

v is an integer such that the number-average molecular weight of the polyether block of formula -[OR$^4$]$_v$- ranges from 60 g/mol to 22 000 g/mol;

w is an integer such that the number-average molecular weight (Mn) of the (poly)urethane-dialdehyde of formula (I) ranges from 500 g/mol to 22 000 g/mol.

* * * * *